United States Patent
Grigorenko et al.

(10) Patent No.: US 8,802,151 B2
(45) Date of Patent: Aug. 12, 2014

(54) PREPARATION OF SHAPED METAL PARTICLES AND THEIR USES

(75) Inventors: Nikolay A. Grigorenko, Brugg (CH); Andreas Muehlebach, Frick (CH); Michael Muehlebach, legal representative, Frick (CH); Florian Muehlebach, legal representative, Frick (CH)

(73) Assignee: BASF SE, Ludwigshafen (DE)

( * ) Notice: Subject to any disclaimer, the term of this patent is extended or adjusted under 35 U.S.C. 154(b) by 99 days.

(21) Appl. No.: 13/259,186

(22) PCT Filed: Mar. 17, 2010

(86) PCT No.: PCT/EP2010/053473
§ 371 (c)(1), (2), (4) Date: Apr. 4, 2012

(87) PCT Pub. No.: WO2010/108837
PCT Pub. Date: Sep. 30, 2010

(65) Prior Publication Data
US 2012/0283336 A1 Nov. 8, 2012

(30) Foreign Application Priority Data
Mar. 24, 2009 (EP) .................... 09156050

(51) Int. Cl.
| | | |
|---|---|---|
| *A61K 9/14* | (2006.01) |
| *B22F 9/00* | (2006.01) |
| *C21B 15/04* | (2006.01) |
| *C22B 5/20* | (2006.01) |
| *C22C 1/04* | (2006.01) |
| *C08K 3/10* | (2006.01) |
| *C09D 5/08* | (2006.01) |
| *A01N 25/00* | (2006.01) |
| *A61K 47/00* | (2006.01) |
| *C08K 3/22* | (2006.01) |
| *H01M 8/12* | (2006.01) |
| *C22C 9/00* | (2006.01) |
| *C22C 5/06* | (2006.01) |
| *C22C 5/02* | (2006.01) |
| *C22C 18/00* | (2006.01) |
| *C22C 20/00* | (2006.01) |
| *C01B 35/04* | (2006.01) |
| *C22C 38/00* | (2006.01) |
| *C22C 14/00* | (2006.01) |
| *C22C 27/06* | (2006.01) |
| *C22C 22/00* | (2006.01) |
| *C22C 19/07* | (2006.01) |
| *C22C 19/03* | (2006.01) |
| *C22C 5/04* | (2006.01) |
| *B22F 1/00* | (2006.01) |

(52) U.S. Cl.
USPC .......... 424/489; 514/769; 524/407; 524/413; 524/435; 524/403; 420/469; 420/501; 420/507; 420/513; 420/525; 420/417; 420/428; 420/434; 420/8; 420/435; 420/441; 420/462; 420/463; 420/461; 420/466; 420/591; 75/370

(58) Field of Classification Search
None
See application file for complete search history.

(56) References Cited

U.S. PATENT DOCUMENTS

| | | | |
|---|---|---|---|
| 4,325,863 | A | 4/1982 | Hinsken |
| 4,338,244 | A | 7/1982 | Hinsken |
| 5,175,312 | A | 12/1992 | Dubs et al. |
| 5,216,052 | A | 6/1993 | Nesvadba et al. |
| 5,252,643 | A | 10/1993 | Nesvadba |
| 7,074,351 | B2 | 7/2006 | Dobler et al. |
| 2003/0122114 | A1 | 7/2003 | Dobler et al. |
| 2003/0180511 | A1 | 9/2003 | Yukinobu et al. |
| 2003/0199653 | A1* | 10/2003 | McCormick et al. ...... 526/219.6 |
| 2005/0061678 | A1 | 3/2005 | Holladay et al. |
| 2005/0217429 | A1 | 10/2005 | Kim et al. |
| 2006/0235087 | A1 | 10/2006 | Alexandridis et al. |
| 2006/0252857 | A1 | 11/2006 | Shafer et al. |
| 2007/0118936 | A1 | 5/2007 | Matsunami |

Ag⁺ + Polymer
Ag(I) compound solution or dispersion

NaBH₄ →

Ag(0) spherical seeds dispersion
Size can be tuned: 2-200 nm

H₂O₂ →

Ag(0) platelets dispersion
Size can be tuned: 15-1000 nm
Thickness can be tuned: 3-100 nm

| | | | |
|---|---|---|---|
| 2008/0145647 | A1* | 6/2008 | Ganguli et al. ............... 428/328 |
| 2008/0295646 | A1 | 12/2008 | Mirkin et al. |
| 2009/0236569 | A1 | 9/2009 | Pike-Biegunski et al. |

FOREIGN PATENT DOCUMENTS

| | | |
|---|---|---|
| DE | 43 16 611 | 11/1993 |
| DE | 43 16 622 | 11/1993 |
| DE | 43 16 876 | 11/1993 |
| EP | 0 589 839 | 3/1994 |
| EP | 0 591 102 | 4/1994 |
| EP | 1 291 384 | 3/2003 |
| JP | 2007-169680 | 7/2007 |
| JP | 2009-221140 | 10/2009 |
| WO | 99 03938 | 1/1999 |
| WO | 00 40630 | 7/2000 |
| WO | 01 44332 | 6/2001 |
| WO | 01 51534 | 7/2001 |
| WO | 2004 045755 | 6/2004 |
| WO | 2004 089813 | 10/2004 |
| WO | 2005 080030 | 9/2005 |
| WO | 2006 099312 | 9/2006 |
| WO | 2008/003522 | 1/2008 |
| WO | 2008 035996 | 3/2008 |
| WO | 2009 056401 | 5/2009 |
| WO | WO 2009056401 A1 * | 5/2009 |

OTHER PUBLICATIONS

Torres, V., et al., "Silver nanoprism coatings on optical glass substrates," Microelectronic Engineering, vol. 84, pp. 1665-1668, (2007).

Xue, C., et al., "Self-Assembled Monolayer Mediated Silica Coating of Silver Triangular Nanoprisms," Advanced Materials, vol. 19, pp. 4071-4074, (2007).

International Search Report issued Jun. 16, 2010 in PCT/EP10/053473 filed Mar. 17, 2010.

European Search Report issued Sep. 23, 2009 in European Patent Application No. 09 156050 filed Mar. 24, 2009.

U.S. Appl. No. 13/411,582, filed Jun. 27, 2012, Grigorenko, et al.

Japanese Office Action issued Apr. 7, 2014 in connection with corresponding Japanese Patent Application No. 2012-501247, filed Mar. 17, 2010.

* cited by examiner

*Primary Examiner* — Carlos Azpuru

*Assistant Examiner* — Casey Hagopian

(74) *Attorney, Agent, or Firm* — Oblon, Spivak, McClelland, Maier & Neustadt, L.L.P.

(57) ABSTRACT

The instant invention relates to shaped transition metal particles, in particular in the form of a dispersion in an aqueous and/or organic medium, the manufacture thereof and their use as an infrared (IR) absorbing agent, an IR curing agent for coatings, an additive in conductive formulations, an antimicrobial agent or for sensoring organic and/or inorganic compounds. Further, the invention relates to dispersions comprising said shaped particles and an aqueous and/or organic medium, such as a thermoplastic or crosslinkable polymer, as well as to antimicrobial compositions and products.

14 Claims, 3 Drawing Sheets

PREPARATION OF SHAPED METAL PARTICLES AND THEIR USES

Figure 1:
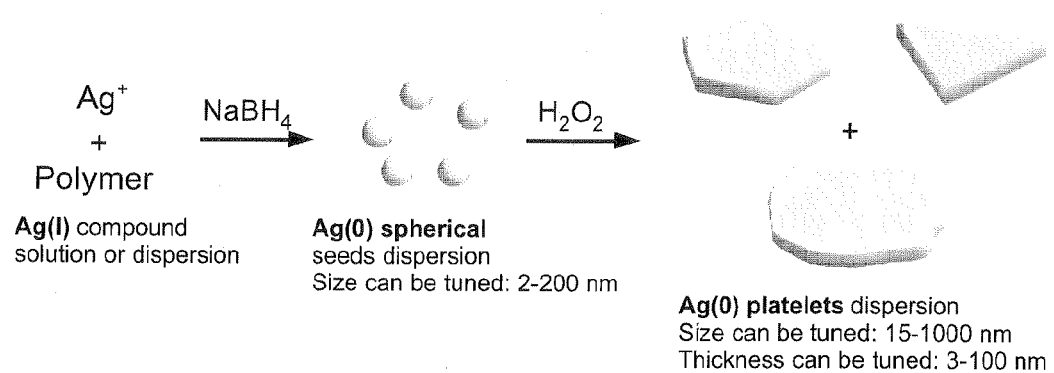

The instant invention relates to the method of manufacture of shaped transition metal particles in form of nanoplatelets, in particular in the form of a dispersion in an aqueous and/or organic medium, and the use of said particles as an infrared (IR) absorbing agent, an IR curing agent for coatings, an additive in conductive formulations, printing inks and coating compositions, an antimicrobial agent or for sensoring organic and/or inorganic compounds. Further, the invention relates to dispersions comprising said shaped particles and an aqueous and/or organic medium, such as a thermoplastic or crosslinkable polymer, as well as to antimicrobial compositions and products.

Metal nanoparticles or nanoclusters have been used for a variety of applications in the fields of chemical and biodetection, catalysis, optics and data-storage. Gold and silver nanostructures are of particular interest due to their unusual optical properties that are dependent on size and shape.

For example, US2008/0295646 describes a thermal method of preparing metal, in particular silver nanoprisms having a unimodal size distribution and a predetermined thickness in the form of a colloidal suspension. A photochemical method of preparing silver nanoprisms of controlled edge length through wavelength modulation is described in WO2004/089813. WO2006/099312 describes the synthesis of gold nanoprisms. Silica-coated silver prisms which can be dispersed in a variety of organic solvents are described in C. Xue et al., Adv. Mater. 19, 2007, 4071. Silver nanoprism coatings on optical glass substrates are described in Torres et al., Microelectronic Engineering 84, 2007, 1665-1668.

US 2003/0180511 discloses a process for producing a noble-metal type fine particle dispersion comprising an agglomeration step of adding hydrazine solution to a dispersion in which primary particles of noble metal agglomerate in the form of chains and a stabilization step of adding a hydrogen peroxide solution to said dispersion to decompose and remove the hydrazine to stabilize the dispersibility of the chainlike agglomerates of spherical particles in the dispersion, i.e. hydrogen peroxide is used for a different purpose.

WO09/056,401 describes nano-shaped transition metal particles, in particular nanoplatelets, characterized by a surface plasmon resonance in the near infrared (NIR) range and their preparation. These particles are used as IR absorbers in heat shielding architectural, automotive glazing or agricultural films, laser welding, laser printing, security printing and near infrared curing of coatings.

It is also known that a number of metal ions shows antimicrobial activity, for example silver, copper, zinc, gold, nickel, iron, titanium, palladium or platinum. The reservoir from which the metal ion is released over time may be the metal or a metal compound. In case of silver, pure silver metal is relatively insoluble in most fluids and will release $Ag^+$ only in very small amounts on contact with moisture through an oxidation process, i.e. the durability of the antimicrobial effect of metallic silver is essentially very high.

So far, the preparation of prism-shaped metal particles requires relatively low concentrations of metal salt of about 0.1 mM (mmol per liter) or less. Therefore, there is a continuing need for the preparation of shaped metal particles in a larger volume and in a more cost effective manner.

An improved method of manufacturing shaped transition metal particles has now been found.

Accordingly, the present invention is directed to a method of manufacturing shaped transition metal particles in the form of nanoplatelets, selected from the group consisting of Cu, Ag, Au, Zn, Cd, Ti, Cr, Mn, Fe, Co, Ni, Ru, Rh, Pd, Os, Ir and Pt, which method comprises the steps of first a) adding a reducing agent to an aqueous mixture comprising a transition metal salt and a polymeric dispersant, and subsequently b) treating the obtained colloidal dispersion with a peroxide, wherein the aqueous mixture in step a) comprises the transition metal salt in a concentration of higher than 2 mmol per liter.

A preferred aspect is a method, which method comprises the steps of first a) mixing a solution of reducing agent with an aqueous mixture comprising a transition metal salt and a polymeric dispersant and optionally additives to form a dispersion of spherical metal particles, and subsequently b) treating said dispersion with a peroxide, wherein a controlled agglomeration of said spherical particles induced to form platelet-shaped metallic particles.

The shaped transition metal particles of the invention are hereinafter designated as shaped particles.

The transition metal is preferably Ag, Cu or Au, more preferably Ag. The shaped particles may also be made from two of the above-mentioned transition metals to form core-shell or alloy type particles.

The metal salt used in step a) of the present invention is preferably a silver(I) salt, selected from the group consisting of $AgNO_3$; $AgClO_4$; $Ag_2SO_4$; $AgCl$, $AgBr$, $AgI$, $AgOH$; $Ag_2O$; $AgBF_4$; $AgIO_3$; $AgPF_6$; $R^1CO_2Ag$, $R^1SO_3Ag$, wherein $R^1$ is unsubstituted or substituted $C_1$-$C_{18}$alkyl, unsubstituted or substituted $C_5$-$C_8$cycloalkyl, unsubstituted or substituted $C_7$-$C_{18}$aralkyl, unsubstituted or substituted $C_6$-$C_{18}$aryl or unsubstituted or substituted $C_2$-$C_{18}$heteroaryl; Ag salts of dicarboxylic, tricarboxylic, polycarboxylic acids, polysulfonic acids, P-containing acids and mixtures thereof.

Suitable examples of silver salts of mono-, di-, tri- or polycarboxylic acids include silver salts of acetic acid, propionic acid, 4-cyclohexyl butyric acid, oxalic acid, malonic acid, succinic acid, malic acid, maleic acid, fumaric acid, glutaric acid, adipic acid, citric acid and polyacrylic acid.

Suitable examples of silver salts of sulfonic or polysulfonic acids include silver salts of methane sulfonic acid, trifluormethane sulfonic acid, vinyl sulfonic acid, benzene sulfonic acid, toluene sulfonic acid, styrene sulfonic acid and sulfonated polystyrene.

Suitable examples of silver salts of P-containing acids include silver salts of phosphoric acid, metaphosphoric acid, phosphorous acid, pyrophosphoric acid, hypophosphoric acid and organo-substituted derivatives thereof, phenol-phosphate resins, polyacrylic phosphates and phosphonates.

Preferred silver(I) salts are $AgNO_3$, $Ag_2O$, $AgClO_4$, $Ag_2SO_4$, $CH_3CO_2Ag$, mono-, di- or trisilver citrate, $CH_3SO_3Ag$, $CF_3SO_3Ag$, wherein $AgNO_3$, $CH_3CO_2Ag$ and $Ag_2O$ are more preferred.

Examples of suitable gold salts are $KAu(CN)_2$; AuI; AuBr; AuCl; $R^1CO_2Au$, wherein $R^1$ has the same meaning, as described for $R^1CO_2Ag$; $HAuCl_4$; $AuBr_3$; $AuBr_4K$; $AuBr_4Na$; $AuCl_3$; $AuCl_4K$; $AuCl_4Li$; $AuCl_4Na$ and mixtures thereof, wherein $HAuCl_4$ is preferred.

Examples of suitable copper salts are $Cu(NO_3)_2$; $KCu(CN)_2$; copper(II)acetylacetonate; $Cu(R^1CO_2)_2$, wherein $R^1$ has the same meaning, as described for $R^1CO_2Ag$; $Cu(ClO_4)_2$; CuBr, $CuBr_2$, CuCl, $CuCl_2$, CuI, $CuSO_4$ and mixtures thereof.

Alkyl, e.g. $C_1$-$C_4$alkyl, $C_1$-$C_8$alkyl, $C_1$-$C_{12}$alkyl, $C_1$-$C_{18}$alkyl, $C_8$-$C_{24}$alkyl or $C_1$-$C_{25}$alkyl, may be in the given range linear or branched, where possible. Examples are methyl, ethyl, propyl, isopropyl, butyl, sec-butyl, isobutyl, tert-butyl, pentyl, 2-pentyl, 3-pentyl, hexyl, 2,2-dimethylpropyl, 1,1,3,3-tetramethylpentyl, 1-methylhexyl, 1,1,3,3,5,5-hexamethylhexyl, heptyl, isoheptyl, 1,1,3,3-tetramethylbutyl, 1-methylheptyl, 3-methylheptyl, octyl, 2-ethylhexyl, nonyl, decyl, undecyl, dodecyl, tridecyl, tetradecyl, pentadecyl, hexadecyl, heptadecyl, and octadecyl. Alkoxy is alkyl-O—; alkylthio is alkyl-S—.

$C_5$-$C_8$cycloalkyl may be cyclopentyl, cyclohexyl, cycloheptyl, cyclooctyl, methylcyclopentyl, dimethylcyclopentyl, methylcyclohexyl and dimethylcyclohexyl, preferably cyclohexyl.

$C_7$-$C_{18}$aralkyl may be benzyl, 2-benzyl-2-propyl, β-phenyl-ethyl (phenethyl), α,α-dimethylbenzyl, ω-phenyl-butyl, ω,ω-dimethyl-ω-phenyl-butyl, ω-phenyl-dodecyl, in which both the aliphatic and the aromatic hydrocarbon group may be unsubstituted or substituted. Preferred examples are benzyl, phenethyl and α,α-dimethylbenzyl.

$C_1$-$C_{12}$haloalkyl denotes alkyl substituted by halogen; this includes perhalogenated alkyl such as perfluoroalkyl, especially $C_1$-$C_4$ perfluoroalkyl, which is a branched or unbranched radical such as for example —$CF_3$, —$CF_2CF_3$, —$CF_2CF_2CF_3$, —$CF(CF_3)_2$, —$(CF_2)_3CF_3$, and —$C(CF_3)_3$.

$C_6$-$C_{18}$aryl may be phenyl, naphthyl, biphenyl, terphenylyl, phenanthryl or fluorenyl. Preferred examples are phenyl, 1-naphthyl and 2-naphthyl.

$C_2$-$C_{18}$heteroaryl may be furanyl, pyrrolyl, thienyl, pyridyl and indolyl. Preferred examples are furanyl, pyrrolyl, thienyl and pyridyl.

$C_1$-$C_{18}$alkoxy may be straight-chain or branched alkoxy groups, e.g. methoxy, ethoxy, n-propoxy, isopropoxy, n-butoxy, sec-butoxy, isobutoxy, tert-butoxy, amyloxy, isoamyloxy or tert-amyloxy, heptyloxy, octyloxy, isooctyloxy, nonyloxy, decyloxy, undecyloxy, dodecyloxy, tetradecyloxy, pentadecyloxy, hexadecyloxy, heptadecyloxy and octadecyloxy. The term "alkylthio group" means the same groups as the alkoxy groups, except that the oxygen atom of the ether linkage is replaced by a sulfur atom.

$C_2$-$C_{1000}$alkoxy interrupted by at least one $NR^4$ and/or O atom may be straight chain or branched alkoxy groups, which are preferably based on polyethylene oxide, polypropylene oxide, polybutylene oxide or polyethylene imine units.

$C_5$-$C_{11}$heterocycloalkyl may be aliphatic heterocyclic moieties, as well as unsaturated variants thereof, wherein at least 1, especially 1 to 3 heteromoieties, usually selected from O, S, $NR^{10}$, where $R^{10}$ is H or $C_1$-$C_8$alkyl, for example piperidyl, tetrahydrofuranyl, piperazinyl and morpholinyl. Unsaturated variants may be derived from these structures by abstraction of a hydrogen atom on 2 adjacent ring members with formation of a double bond between them.

Alkenyl groups, e.g. $C_8$-$C_{24}$alkenyl, may be within the given limits of carbon atoms straight-chain or branched, where possible. Examples are n-oct-2-enyl, n-dodec-2-enyl, isododecenyl, oleyl, n-dodec-2-enyl or n-octadec-4-enyl. The term alkenyl also comprises residues with more than one double bond that may be conjugated or non-conjugated, for example, it may comprise one double bond.

$C_1$-$C_{12}$alkylene may be derived from above-defined alkyl by abstracting a hydrogen atom from any terminal carbon atom of the alkyl. Where indicated as interrupted, any alkylene moiety of more than one, especially more than 2 carbon atoms may be interrupted by a group such as —O—, —CO—, —COO—, —OCNR$^8$—, —NR$^8$—, —CR$^9$=CR$^{10}$—, or —C≡C—, wherein $R^8$, $R^9$ and $R^{10}$ are independently and in each occurrence H, $C_1$-$C_{12}$alkyl, $C_5$-$C_{12}$cycloalkyl or phenyl. They may be interrupted by one or more of these spacer groups, one group in each case being inserted, in general, into one carbon-carbon bond. Where indicated as substituted, any alkylene may be substituted by a ketone, ester or amide group. In case the interrupted alkylene is additionally substituted, the substituents are generally not α to the heteroatom. If two or more interrupting groups of the type —O—, —NR$^8$— occur in one radical, they often are identical.

Possible substituents of the above-mentioned groups are $C_1$-$C_8$alkyl, OH, SH, halogen such as F, Cl, Br, I, $C_1$-$C_8$alkoxy, $C_1$-$C_8$alkylthio, CN, COR, COOR$^{11}$, CONHR$^{11}$, CONR$^{11}$R$^{12}$, NHR$^{11}$, NR$^{11}$R$^{12}$, SiR$^{11}$R$^{12}$R$^{13}$ or a nitro group, wherein $R^{11}$, $R^{12}$ and $R^{13}$ independently are selected from H, $C_1$-$C_{12}$alkyl, $C_1$-$C_{12}$haloalkyl, $C_5$-$C_{10}$aryl, $C_3$-$C_{12}$cycloalkyl, preferably from $C_1$-$C_6$alkyl, phenyl, cyclopentyl, cyclohexyl.

The term (meth)acryl refers to acryl or methacryl or a combination thereof. The term acrylic(s) refers to acrylic(s) or methacrylic(s) or a combination thereof.

The dispersant may be any polymer which prevents agglomeration or aggregation of the spherical and shaped particles. The dispersant may be a non-ionic, anionic or cationic polymer having a weight average molecular weight of from 500 to 2,000,000 g/mol, preferably from 1500 to 1,000, 000, which forms a solution or emulsion in the aqueous mixture. Typically, the polymers may contain polar groups. Suitable polymeric dispersants often possess a two-component structure comprising a polymeric chain and an anchoring group. The particular combination of these leads to their effectiveness.

Polymeric dispersants may be polyelectrolytes, like polyvinylalcohol, polyvinylacetate, polyvinylpropionate, polyvinylpyrrolidone, polyvinylpyrrolidine, polyesters, polyethyleneimine, polyvinylpyridine and copolymers or blends of them; polymers, random copolymers, AB-block copolymers and the like, comb-copolymers and the like, based on polyether, polyurethane, polyacrylics, polyester, polyamide, polyalkylene glycols, e.g. polyethylene, polypropylene or polybutylene glycols, vinyl polymers, aromatic vinyl polymers, and the like, optionally partially neutralised, quaternised and/or modified with polar groups, like carboxylate, sulfonate, phosphonate, hydroxy, ether, ester and/or amine groups.

The above-mentioned polymers may also be copolymers derived from the corresponding monomers or any other suitable monomer known in the art. Suitable polymers are, for example, described in Examples of WO00/40630, WO01/51534, WO99/03938 and WO01/44332. Preferred are acrylic copolymers which are disclosed in WO04/045755 which are hereby incorporated by reference.

For example, the polymeric dispersant may be derived from the acrylate of formula (I)

$$CH_2=C(R^2)-(C=O)-R^3 \qquad (I),$$

wherein
$R^2$ is hydrogen or $CH_3$,
$R^3$ is $NH_2$, OH, O$^-$(M$^+$), glycidyl, unsubstituted $C_1$-$C_{18}$alkoxy, $C_2$-$C_{1000}$alkoxy interrupted by at least one $NR^4$ and/or O atom, or hydroxy-substituted $C_1$-$C_{18}$alkoxy, unsubstituted $C_1$-$C_{18}$alkylamino, di($C_1$-$C_{18}$alkyl)amino, $C_5$-$C_{11}$heterocycloalkyl, hydroxy-substituted $C_1$-$C_{18}$alkylamino or hydroxy-substituted di($C_1$-$C_{18}$alkyl)amino, —O—$CH_2$—$CH_2$—N($CH_3$)$_2$ or —O—$CH_2$—$CH_2$—N$^+$H($CH_3$)$_2$An$^-$ or the residue of a bi- or tricyclic hydrocarbon;
$R^4$ is H or $C_1$-$C_{18}$alkyl;
An$^-$ is an anion of a monovalent organic or inorganic acid; and M+ is a metal cation or an ammonium ion which may be substituted by one or more $C_1$-$C_4$alkyl.

Examples for $R^3$ as $C_2$-$C_{1000}$alkoxy interrupted by at least one O atom are of formula

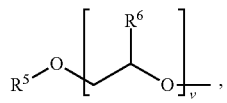

wherein
$R^5$ is $C_1$-$C_{25}$alkyl, phenyl or phenyl substituted by $C_1$-$C_{18}$alkyl,
$R^6$ is H, methyl, ethyl or propyl, and
v is an integer from 1 to 1000.

These monomers are, for example, derived from non ionic surfactants by acrylation of the corresponding alkoxylated alcohols or phenols. The repeating units may be derived from $C_2$-$C_6$alkylene oxide, e.g. ethylene oxide, propylene oxide, butylene oxide or mixtures thereof.

The poly(meth)acrylate may be prepared from a monomer or monomer mixture according to formula (I). Other co-monomers may be any acrylate or methacrylate, as described below.

Examples of suitable co-monomers may be alkyl(meth) acrylates, e.g. methyl, ethyl, butyl; isobornyl(meth)acrylate; norbornyl(meth)acrylate; tetrahydrofurfuryl(meth)acrylate; isophoryl(meth)acrylate; 2-phenoxyethyl(meth)acrylate; (meth)acrylonitrile; (meth)acrylamide; or aromatic vinyl monomers such as styrene or p-methylstyrene.

Also possible co-monomers may be higher molecular weight (oligomeric) polyunsaturated compounds such as acrylated epoxy resins, acrylated polyesters, polyurethanes and polyethers.

Further examples of co-monomers may be vinyl acrylate, trimethylolpropane tri(meth)acrylate, trimethylolethane tri (meth)acrylate, tetramethylene glycol di(meth)acrylate, triethylene glycol di(meth)acrylate, pentaerythritol di(meth) acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra (meth)acrylate, dipentaerythritol penta(meth)acrylate, dipentaerythritol hexa(meth)acrylate, tripentaerythritol octa(meth) acrylate, pentaerythritol diitaconate, dipentaerythritol trisitaconate, dipentaerythritol pentaitaconate, dipentaerythritol hexaitaconate, ethylene glycol diacrylate, propylene glycol diacrylate, 1,3-butanediol di(meth)acrylate, neopentyl glycol diacrylate, hexamethylene glycol diacrylate, bisphenol-A diacrylate, 4,4'-bis(2-acryloyloxyethoxy)-diphenylpropane, sorbitol triacrylate, sorbitol tetra(meth)acrylate, pentaerythritol-modified triacrylate, sorbitol pentaacrylate, sorbitol hexaacrylate, oligoester(meth)acrylates, glycerol di- and tri-acrylate, 1,4-cyclohexane diacrylate, bis(meth)acrylates of polyethylene glycol having a molecular weight of from 200 to 1500, methylene bisacrylamide, 1,6-hexamethylene bisacrylamide, diethylenetriamine trismethacrylamide, bis(methacrylamidopropoxy)ethane, β-methacrylamidoethyl methacrylate and N-[(β-hydroxyethoxy)ethyl]-acrylamide and mixtures thereof.

Suitable commercially available polymeric dispersants are, for example, EFKA® 4046, 4047, 4060, 4300, 4330, 4580, 4585, 8512, Disperbyk® 161, 162, 163, 164, 165, 166, 168, 169, 170, 2000, 2001, 2050, 2090, 2091, 2095, 2096, 2105, 2150, Ajinomoto Fine Techno's PB® 711, 821, 822, 823, 824, 827, Lubrizol's Solsperse® 24000, 31845, 32500, 32550, 32600, 33500, 34750, 36000, 36600, 37500, 39000, 41090, 44000, 53095, ALBRITECT® CP30 (a copolymer of acrylic acid and acrylphosphonate) and combinations thereof.

Preference is given to polymers derived from hydroxyalkyl (meth)acrylates and/or polyglycol(meth)acrylates, such as hydroxyethyl and hydroxypropyl(meth)acrylate, polyethylene glycol(meth)acrylates, (meth)acrylates having amine functionality, for example, N-[3-(dimethylamino)propyl] (meth)acrylamide or 2-(N,N-dimethylamino)ethyl(meth) acrylate.

In particular, non-ionic copolymer dispersants having amine functionality are preferred. Such dispersants are commercially available, for example as EFKA 4300, EFKA 4580 or EFKA 4585.

Further suitable dispersants are, for example, condensation products of aromatic sulfonic acids and formaldehyde, condensation products of aromatic sulfonic acids with unsubstituted or chlorinated biphenyls or biphenyl oxides and optionally formaldehyde, (mono-/di-)alkyl-naphthalenesulfonates, polymerised organic sulfonic acids or salts thereof, such as polymerised alkylnaphthalenesulfonic acids, polymerised alkylbenzenesulfonic acids, alkyl polyglycolether sulfates, polyalkylated polynuclear arylsulfonates, methylene-linked condensation products of arylsulfonic acids and hydroxyarylsulfonic acids, sodium salts of dialkylsulfosuccinic acids, sodium salts of alkyl diglycol ether sulfates, sodium salts of polynaphthalene methanesulfonates, ligno- or oxyligno-sulfonates or heterocyclic polysulfonic acids.

Particularly preferred dispersants are sodium salts of sulfonated polystyrene and condensation products with formaldehyde.

Other alkyl ether carboxylates corresponding to the formula $R^7$—(OCH$_2$CH$_2$)$_x$O-L-CO$_2$M,
wherein
$R^7$ is a $C_8$-$C_{24}$alkyl or $C_8$-$C_{24}$alkenyl group;
x is 2 to 8;
L is a $C_1$-$C_{12}$alkylene group, which may interrupted by —O—, —CO—, —COO—, —OCNR$^8$—, —NR$^8$—, —CR$^9$=CR$^{10}$—, or —C≡C— and/or substituted by a ketone, ester or amide group, wherein $R^8$, $R^9$ and $R^{10}$ is H, $C_1$-$C_{12}$alkyl, $C_5$-$C_{12}$cycloalkyl or phenyl; and
M is H, an ammonium ion which may be substituted by $C_1$-$C_4$alkyl, or metal cation.

Further polymeric dispersants may be acyl lactylates corresponding to the formula

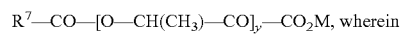

$R^7$ is a $C_8$-$C_{24}$alkyl or $C_8$-$C_{24}$alkenyl group;
y is 3 to 10, and
M is H, an ammonium ion which may be substituted by $C_1$-$C_4$alkyl, or metal cation.

An example is sodium cocoyl lactylate.

Organic phosphates of the general formula (II)

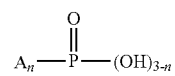

are also suitable polymeric dispersants which may be derived from the above-mentioned alkyl ether carboxylates, wherein A is $R^7$—(OCH$_2$CH$_2$)$_x$—O—, and acyl lactylates, wherein A is $R^7$—CO—[O—CH(CH$_3$)—CO]$_y$—; n is 1 or 2. Corresponding salts are also possible.

Further examples of polymeric dispersants include polyoxyethylene alkyl ethers such as polyoxyethylene lauryl ether, polyoxyethylene stearyl ether and polyoxyethylene oleyl ether; polyoxyethylene alkylphenyl ethers such as polyoxyethylene octylphenyl ether and polyoxyethylene nonylphenyl ether; polyethylene glycol diesters such as polyethylene glycol dilaurate and polyethylene glycol distearate; sorbitan fatty acid esters; fatty acid modified polyesters; tertiary amine modified polyurethanes and the like.

Further examples of a suitable dispersant may be a condensation product of O—($C_8$-$C_{20}$alkyl)-polyalkylene glycol, for example derived from corresponding polyethylene glycol, polypropylene or polybutylene glycol, and a cyclic anhydride such as succinic anhydride or glutaric anhydride. These compounds may also be used as a metal salt such as a sodium or potassium salt.

The polymeric dispersants may be used alone or in admixture of two or more.

Suitable reducing agents may be selected from the group consisting of boranes and complexes thereof, metal boranates, hydrides, aluminates, aldehydes, carboxylic acids, hydrazines, hydrosulfites, stannanes, stannates, silanes, phosphines, phosphites and siloxanes.

Examples of boranes and complexes thereof are diborane; borane sulfide complexes, e.g. borane dimethylsulfide complex; borane amine complexes, e.g. complexes with dimethylamine, diethylamine, trimethylamine, triethylamine, diethylaniline, tert-butylamine, morpholine or pyridine; borane tetrahydrofuran complex; methyl oxazaborolidine, diisopinocampheylchloroborane, methoxydiethylborane, dibutylboron triflate, dicyclohexylboron triflate, dicyclohexylchloroborane.

Examples of metal boronates are sodium borohydride ($NaBH_4$), sodium cyanoborohydride ($NaBH_3CN$), sodium triacetoxy borohydride ($NaHB(OAc)_3$), sodium tri-sec-butylborohydride, potassium tri-sec-butylborohydride, potassium triethylborohydride, lithium triethylborohydride, lithium tri-sec-butylborohydride, nickel borohydride.

Examples of aluminates are diisobutylaluminium hydride, lithium aluminum hydride and sodium bis(2-methoxyethoxy)aluminum hydride.

Further examples of suitable reducing agents are ascorbic acid, oxalic acid, formic acid, formaldehyde, hydrazine, substituted hydrazines, e.g. 1,1-dimethylhydrazine or 1,2-dimethylhydrazine, sodium hydrosulfite, tributylstannane, tributyltin hydride, triphenyl-phosphine, triphenylphosphite, trichlorosilane, triethylsilane, tris(trimethylsilyl)silane and polymethylhydrosiloxane.

Preference is given to sodium borohydride, borane complexes with sulfides and amines, hydrazine and ascorbic acid.

Examples of suitable peroxides are selected from the group consisting of $H_2O_2$, $C_1$-$C_8$alkyl peroxyacids, e.g. peracetic acid, acetyl cyclohexane sulfonyl peroxide, diisopropyl peroxydicarbonate, tert-amyl perneodecanoate, tert-butyl perneodecanoate, tert-butyl perpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinic acid peroxide, diacetyl peroxide, dibenzoyl peroxide, tert-butyl per-2-ethylhexanoate, bis(4-chlorobenzoyl)-peroxide, tert-butyl perisobutyrate, tert-butyl permaleinate, 1,1-bis(tert-butylperoxy)3,5,5-trimethylcyclohexane, 1,1-bis(tert-butylperoxy)cyclohexane, tert-butyl peroxy isopropylcarbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2 bis(tert-butylperoxy)propane, dicumyl peroxide, 2,5-dimethylhexane-2,5-di-tert-butylperoxide, 3-tert-butylperoxy 3-phenylphthalide, di-tert-amyl peroxide, α,α'-bis(tert-butylperoxyisopropyl)benzene, 3,5-bis(t-butylperoxy)3,5-dimethyl 1,2-dioxolane, di-tert-butylperoxide, 2,5-dimethylhexyne-2,5-di-tert-butylperoxide and 3,3,6,6,9,9-hexamethyl-1,2,4,5-tetraoxacyclononane, wherein $H_2O_2$ is preferred.

Optionally, the mixture of step a) of the present invention contains a capping agent. If present, the capping agent is typically used in a concentration up to 50 mM, preferably from 0.01 to 30 mM.

Examples of suitable capping agents include polycarboxylic acid salts, such as citrate salts, ethylenetetraminetetraacetate (EDTA) salts and polyamino carboxylic acid salts like diethylenetriaminepentaacetic acid salts, N-hydroxyethylethylenediaminetriacetic acid salts and nitrilotriacetic acid salts. Trisodium and tripotassium citrates are preferred.

Alternatively, the method of the invention may be carried out in the absence of a capping agent such as trisodium and tripotassium citrates. A preferred embodiment is directed to a method wherein no carboxylic acid- or carboxylate-containing additive is present, in particular no polycarboxylic acid- or polycarboxylate-containing additive. This embodiment especially includes the absence of both capping agents mentioned above and polymeric dispersants having carboxylic acid or carboxylate groups.

In a preferred embodiment, at least one further additive, especially a water-soluble additive, may be present in step a) of the inventive process.

For example, S-containing additives such as thiols, disulfides, polysulfides, xanthates, dithiocarbamates and the like may be added as a water-soluble additive or at least partially water-soluble additive. Mixtures of one or more S-containing additives may also be used. Preferably, a thiol is used, optionally in combination with another thiol, a disulfide, a xanthate or a dithiocarbamate.

Examples of suitable thiols may be thiols derived from polyalkylene glycols such as polyethylene or polypropylene glycols having an average molecular weight of from 500 to 10,000, preferably of from 1000-6000. Preferred thiols are of formula $R^{14}$—X—SH, wherein $R^{14}$ is $C_1$-$C_{25}$alkyl, especially methyl or ethyl, phenyl or phenyl substituted by $C_1$-$C_{18}$alkyl and X is polyethylene glycol or polypropylene glycol having an average molecular weight of from about 1000 to about 6000, preferably about 5000. Examples of suitable thiols which are at least partially water-soluble are 2-mercaptoethanol, mercaptobutanols, mercaptohexanols, 3-mercaptopropionic acid, 11-mercaptoundecanoic acid, cystein, homocystein and the like.

Examples of water-soluble or at least partially water-soluble disulfides are cystamine, mercaptoethanol disulfide, cyclo-dithiothreitol, lipoic acid and the like.

Examples of water-soluble or at least partially water-soluble xanthates are potassium methylxanthogenate, potassium ethylxanthogenate, potassium hexylxanthogenate, xanthan gum, cellulose xanthogenate, polyethyleneglycol xanthogenates, polypropyleneglycol xanthogenates and the like.

Examples of water-soluble or at least water-soluble dithiocarbamates are diethyldithio-carbamate salts, dibenzyldithiocarbamate salts, piperidine dithiocarbamates, polyethyleneimine dithiocarbamates and the like.

Another class of suitable water-soluble additives are amines. Examples of suitable amines are of formula

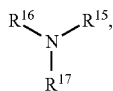

wherein $R^{15}$, $R^{16}$, and $R^{17}$ are independently from each other H, $C_1$-$C_{18}$alkyl, $C_2$-$C_{18}$alkenyl, $C_2$-$C_{18}$alkinyl, phenyl, phenyl substituted by $C_1$-$C_{18}$alkyl, a radical of polyethylene glycol, a radical of polypropylene glycol or a radical of polybutylene glycol. Preferably, the amine is ammonia, methyl amine, dimethyl amine, diethyl amine, allyl amine, butyl amine or hexyl amine, more preferably ammonia.

Additionally, $R^{15}$, $R^{16}$, and $R^{17}$ may independently from each other contain one or more functional groups, such as hydroxy, carboxy, amino, ester, ether, phosphine, thiol, disulfide, xanthate, dithiocarbamate, sulfonic and/or phosphonic acid groups, which groups may increase water solubility and/or affect the stability of the complex with transition metal ions and/or atoms. Examples of such compounds may be ethylenediamine, 1,3-propanediamine, aminoethanol, diethanolamine, bis- and tris-oxymethylamines, glycine, alanine, ethylenediamine tetraacetic acid and its salts, 1,5-diamino-3-oxopentane, cystamine, cysteamine, N,N-dimethylaminoethanol xanthate salts, diethylenetriamine, triethylenetetramine, tetraethylenepentamine and higher oligomers of ethyleneimine, polyethyleneimine. Preferred are ethylenediamine, oligomers of ethyleneimine, polyethylene imine, more preferably polyethylene imine with $M_n$<11000.

A further class of suitable water-soluble additives are alcohols such as polyhydric alcohols. Examples of polyhydric alcohols are diols, glycols, glycerol, sugar alcohols, such as glucitol or inositol, pentaerythritol, trimethylolpropane, polyalkylene glycols and mixtures thereof. Preferably, ethylene glycol, 1,2-propanediol, 1,3-propanediol, diethylene glycol, dipropylene glycole or triethylene glycol may be used, more preferably ethylene glycol. A further class of suitable additives are defoamers such as commercially available TEGO Foamex 1488, 1495, 3062, 7447, 800, 8030, 805, 8050, 810, 815 N, 822, 825, 830, 835, 840, 842, 843, 845, 855, 860, 883, K 3, K 7, K 8, N, Antifoam SE-15 from Sigma and the like.

Accordingly, in a preferred aspect the invention relates to a method, wherein in step a) at least one additive selected from the group consisting of S-containing additive such as a thiol, a disulfide, a xanthate, or a dithiocarbamate, an alcohol, an amine and a defoamer is present. More preferably, the additive is selected from a thiol, a xanthate, a dithiocarbamate, ethylene glycol, ammonia, polyethylene imine and a defoamer is present.

Especially, the aqueous mixture in step a) comprises a thiol and an alcohol, especially a polyhydric alcohol, or a thiol and an amine.

Defoamer may be added in any of the solutions used in steps a) and b) of the present process, preferably in the solution comprising the reducing agent or transition metal salt, or it may be added after mixing the solutions.

Yet in another aspect of the invention, the pH in any of the solutions used in steps a) and b) may be adjusted using water soluble protic acids or bases, such as sulfuric acid, hydrofluoric acid, acetic acid, hydrosulfates and other acid salts, hydroxides of alkali and alkali-earth metals, quaternary ammonium hydroxides and the like, preferably sulfuric or acetic acid or sodium or potassium hydroxide.

One embodiment of interest relates to a method of manufacturing shaped transition metal particles in the form of nanoplatelets, selected from the group consisting of Cu, Ag, Au, Zn, Cd, Ti, Cr, Mn, Fe, Co, Ni, Ru, Rh, Pd, Os, Ir and Pt, which method comprises the steps of first
a) adding a reducing agent to an aqueous mixture comprising a transition metal salt and a polymeric dispersant, and subsequently
b) treating the obtained colloidal dispersion with a peroxide, with the proviso that a water soluble amine is not added after the addition of peroxide.

Generally, the method of the present invention excludes the method described in WO09/056,401; thus, a method for the synthesis, isolation and re-dispersion in organic matrixes of nano-shaped transition metal particles, selected from the group consisting of Zn, Ag, Cu, Au, Ta, Ni, Pd, Pt, Co, Rh, Ir, Fe, Ru, and Ti, comprising
a) adding to an aqueous solution of the transition metal salt an acrylate or methacrylate monomer or oligomer, or a polyacrylate or polymethacrylate and a reducing agent;
b1) treating the colloidal solution with a peroxide; or
b2) exposing the colloidal solution to UV- or visible light;
c) adding a water soluble amine; and
d) isolating the nano-shaped transition metal particles or re-disperse the nano shaped transition metal particles together with a dispersing agent in a liquid acrylate or methacrylate monomer
is excluded.

In the method of the present invention, optionally, the mixture obtained in step a) may be irradiated with light of a sufficient wavelength and for a sufficient time to increase the size of the product particles. When the mixture is exposed to UV or visible light it can be the whole wavelength region from 250 nm to 750 nm or, preferably, a selected wavelength region, such as from 300 to 370 nm or from 500 to 700 nm. The time period of irradiation may be chosen, for example, for about 200 milliseconds to 100 hours; preferred is a prolonged radiation exposure of about 20 to 100 hours; short irradiation times may be more suitable if high intensity light sources are used. It is also possible to use monochromatic light sources and expose to monochromatic light. Light sources, such as lasers or mercury vapor lamps are suitable and commercially available. When the dispersion is irradiated, the temperature should not exceed 80° C., it should preferably be hold between 40 and 70° C. However, it is preferred not to use irradiation during the inventive process.

Typically, the process is carried out in water or in a mixture of a water miscible organic solvent and water, preferably in water. Suitable organic solvents are, for example, alcohols such as ethanol, n-propanol, isopropanol, n-butanol, ethylene glycol or propylene glycol, tetrahydrofuran, 1,4-dioxan and the like. Preferably, an excess of water is used. Alternatively, the process may be carried out in pure alcohol or a mixture of alcohols.

The process is preferably carried out by dissolving or dispersing the transition metal salt in water and optionally alcohol in the presence of a dispersant and optionally a capping agent. The resulting solution or dispersion is held at a temperature of less than 20° C., preferably it is cooled down to 5° C. or less, e.g. about 0 to 5° C., followed by slowly adding an aqueous solution of the reducing agent. Upon completion of the metal salt reduction, the peroxide is added until the desired spectral profile is achieved. This step may be performed at a temperature of from about −10° C. to about 100° C. Preferably, the peroxide is added at a temperature of from 20 to 50° C., more preferably from 20 to 40° C.

The method may also be carried out by dissolving or dispersing the transition metal salt in water in concentration of >2 mM in the presence of a dispersant and optionally at least one of above-mentioned additives and dissolving or dispersing the reducing agent and optionally at least one of above-mentioned water-soluble additives in water. The additives optionally comprised in the first or second mixture may be the same or different. The resulting solutions or dispersions are held at a temperature of less than 20° C., preferably they are cooled down to 5° C. or less, e.g. about 0 to 5° C. These two solutions or dispersions are mixed either by addition of one solution to another, continuously or in one or more portions, or, preferably, they may be mixed by simultaneously pumping both solutions or dispersions into a mixing chamber, said chamber having an additional outlet to collect the resulting dispersion of spherical particles, for example a three-way connector of any shape. Upon completion of the metal salt reduction, the peroxide, preferably a solution thereof in water, is added, continuously or in one or more portions, to the dispersion of spherical particles until the desired spectral profile of reaction mixture is achieved. Especially, no using further reducing agents, such as hydrazine and the like, are added prior to peroxide addition. The step of the peroxide addition may be performed at a temperature of from about 0° C. to about 100° C. Preferably, the peroxide is added at a temperature of from 10 to 80° C., more preferably from 20 to 70° C. The obtained platelet-shaped metal particles are isolated by any means known in the art, e.g. by centrifugation and/or reversible agglomeration using appropriate surface-modifying agents and/or by phase transfer into organic solvent.

The term "desired spectral profile" means that the absorption maximum of the mixture lies between 450, preferably 500 and 2000 nm. The reaction may be monitored by measuring the UV-VIS-NIR absorption.

A typical reaction time for step a) may range from about 1 minute to about 10 hours, preferably from 5 minutes to about 4 hours. A typical reaction time for step b) may range from about 5 minutes to about 24 hours. The reaction is typically applied under normal pressure, normal atmosphere and optionally in the absence of light. However, in some cases it might be of advantage to use an inert gas atmosphere. Suitable gases are argon or nitrogen.

The concentrations of the components are not particularly critical. The total concentration of transition metal (including both, ions and uncharged atoms) in the final mixture of step a) (i.e. in the dispersion of spherical metal particles after addition of reducing agent) is, for example, at least 0.5 mM, preferably higher than 2 mM and may be up to about 500 mM, more preferably from 2.5 mM to 300 mM and most preferably from 3 mM to 200 mM and particularly 5 to 200 mM. Especially, a concentration of from 50 to 200 mM is preferred.

In general, the polymeric dispersant is present in the final mixture of step a) in a concentration of from about 0.001 to about 20% by weight, preferably from 0.005 to 15% by weight and more preferably from 0.01 to 10% by weight, based on the total weight of the mixture of step a). That is, the concentration refers to the mixture obtained after adding the reducing agent.

If a sulfur-containing additive, especially a thiol, xanthate or dithiocarbamate, is present in the mixture of step a), the molar ratio of S-containing groups, especially in the form of thiol, xanthate or dithiocarbamate groups, to transition metal salt may vary between 0.0001:1 to 2:1, preferably between 0.001:1 to 1:1 and more preferably between 0.005:1 to 1:2.

The molar ratio of hydroxyl groups of the alcohol to transition metal salt may vary between 0.0001:1 to 1000:1, preferably from 0.001:1 to 100:1 and more preferably from 0.01:1 to 50:1.

The molar ratio of amino groups of the amine to transition metal salt may vary between 0.0001:1 to 100:1, preferably from 0.001:1 to 10:1 and more preferably from 0.005:1 to 5:1.

The pH in the any of the solutions, used in steps a) and b) can optionally be adjusted in the range from about 1 to 13, preferably from 2 to 12 and more preferably from 3 to 11.

The amount of a defoamer, if present, usually varies depending on the concentrations of the other components, such as, for example, polymeric dispersant and transition metal salt. It may be in the range of from 0.00001% to 5% by weight based on total weight of reaction mixture prior to peroxide addition, preferably from 0.0001% to 3% and more preferably from 0.001% to 2% by weight.

Typically, the reducing agent may be used in step a) in an equivalent amount corresponding to the transition metal salt or higher, up to 100 equivalents. In general, the molar ratio of reducing agent and transition metal salt is approximately from 0.2:1 to 20:1, preferably from 0.25:1 to 4:1.

The molar ratio of peroxide and reducing agent may be in general of from 1:1 to 100000:1, preferably from 10:1 to 10000:1.

Advantageously, the peroxide is not added in one portion to the mixture obtained in step a), i.e. the addition is carried out slowly or stepwise, for example by dropping or injecting, especially as an aqueous solution. Typically, the concentration of the peroxide solution may be varied of from 0.05% to 70% by weight, based on the total weight of the peroxide solution.

It is further important that the steps are carried out in the given order, i.e. the peroxide is added after the addition of the reducing agent, preferably after the reduction has been completely carried out which could be observed by changing the absorption spectrum of the reaction mixture or measuring the concentration of transition metal ions by any method known in the art. This sequence enables an essentially higher starting concentration of the transition metal salt compared to the prior art.

The inventive process provides first in step a) spherical transition metal particles which are subsequently converted to shaped particles in the form platelets in step b). The term "subsequently" means that step b) follows directly step a), i.e. there is no work-up step or the like between step a) and b). In particular, no hydrazine is added prior to peroxide addition. The shaped transition metal particles obtained in the present process are typically in the form of trigonal, truncated trigonal, hexagonal prisms or mixtures thereof, i.e., they differ from regular spheres. Alternatively, the process parameters and conditions can be selected such to provide nanoplatelets with irregularly shaped contours or polygons having various edge lengths.

For example, the longest dimension of the shaped transition metal particles may vary of from about 15 nm to about 3000 nm, preferably from 15 nm to 1000 nm. The thickness of the shaped particles may vary of from about 2 to about 100 nm, preferably from 2 to 30 nm.

Preferably, the shaped transition metal particles are in the form of platelets, especially having a longest dimension of edge length of from 15 nm to 3000 nm, preferably from 15 to 1000 nm, more preferably from 30 nm to 700, most preferably from 30 to 600 nm and particularly from 40 nm to 500 nm, and a thickness of from 2 nm to 100 nm, preferably from 2 to 50 nm, more preferably from 2 to 30 nm and particularly from 4 to 20 nm. More preferred, the shaped particles are in the form of trigonal and/or hexagonal prisms.

The inventive shaped particles are advantageously monocrystalline.

If desired, the shaped particles obtained by step b) can be isolated by known methods such as filtration, centrifugation, reversible or irreversible agglomeration, phase transfer with organic solvent, combination thereof and the like. The shaped particles may be obtained after isolation as a wet paste or dispersion in water. The transition metal content in the final preparation of said particles may be up to about 99% by weight, based on the total weight of the preparation, preferably between 5 to 99% by weight, more preferably 10-95% by weight.

A preferred aspect of the present invention relates to a method which comprises further a step c), wherein water is replaced at least partially with an essentially organic medium or matrix. In particular, water is completely removed.

Preferably, the organic medium or matrix may be a suitable organic solvent, a liquid monomer or oligomer, or a polymer, a water-in-oil emulsion (w/o), an oil-in-water (o/w) emulsion or a combination thereof.

Optionally, further dispersant(s) and/or surface-modifying agents may be added in step c) before water is removed. The dispersant(s) and/or surface-modifying agents may or may not be the same, as used in step a), but usually it is the same. In general, the amount of from about 10% by weight up to the hundredfold amount of the amount used in step a) may be employed.

The organic medium or matrix may comprise or may be a suitable organic solvent, that is, water is partially or completely replaced with an organic solvent, wherein the shaped particles are dispersed. Examples of organic solvents are $C_1$-$C_4$alkanols, $C_2$-$C_4$olyols, $C_3$-$C_6$ketones, $C_4$-$C_8$ethers, $C_1$-$C_8$esters, nitromethane, dimethylsulfoxide, dimethylformamide, dimethylacetamide, N-methylpyrrolidone, sulfolane, polyethylene glycol and polypropylene glycol or mixtures thereof, whereby $C_1$-$C_4$alkanols and $C_1$-$C_4$polyols may be substituted with $C_1$-$C_4$alkoxy. Examples of $C_1$-$C_4$alkanols are ethanol, propanol, isopropanol, butanol, isobutanol, sec-butanol and tert-butanol. Examples of $C_1$-$C_4$alkoxy-derivatives thereof are 2-ethoxyethanol and 1-methoxy-2-propanol. Examples of $C_2$-$C_4$polyols are ethylene glycol, propylene glycol, butylene glycol and glycerol. Examples of $C_3$-$C_6$ketones are acetone and methyl ethyl ketone. Examples of $C_4$-$C_8$ethers are dimethoxyethane, diisopropylether, tetrahydrofuran, dioxane, diethylene glycol dimethylether and diethylene glycol diethylether. Examples of $C_1$-$C_8$esters are ethyl acetate, butyl acetate, n-propyl n-propyonate, n-hexyl n-hexanoate.

The organic medium may also comprise one or more liquid monomers and/or oligomer(s) which may be polymerized in the presence of the shaped particles. Examples of suitable monomers include any ethylenically unsaturated monomer, for example, acrylic monomers, such as (meth)acrylates, di- or tri(meth)acrylates, as mentioned hereinbefore as monomer component of the polymeric dispersant; epoxysubstituted (meth)acrylates, such as glycidyl(meth)acrylate, 2-methylglycidyl(meth)acrylate, 3,4-epoxybutyl(meth)acrylate, 6,7-epoxyheptyl(meth)acrylate; (meth)acrylates or di(meth) acrylates of polyethylene glycol having a molecular weight of from 200 to 1500; epoxy-substituted polyethylene glycols having a molecular weight of from 200 to 1500; or vinyl aromatic compounds, such as styrene, α-methylstyrene, vinyltoluene, p-chlorostyrene, polychlorostyrene, fluorostyrene, bromostyrene, ethoxymethyl styrene, methoxystyrene, 4-methoxy-3-methylstyrene, dimethoxystyrene. Particular preferred is methylmethacrylate.

The organic medium may also comprise a thermoplastic or crosslinkable polymer for use in high organic weight organic materials or coating compositions.

The organic medium may also comprise a water-in-oil or oil-in-water emulsion which is suitably used in household and personal care compositions or products, especially in cosmetic compositions, as described below.

Accordingly, the invention also relates to shaped transition metal particles which are prepared, as described above, especially in the form of a dispersion of said shaped transition metal particles in an aqueous and/or organic medium. Depending on further applications, the content of said particles in the dispersion may be up to about 95% by weight, based on the total weight of the dispersion, preferably between 0.0001 and 90% by weight, more preferably 1-70% by weight.

The shaped particles of the invention may be used in several fields of application that depend on NIR absorption, conductivity and/or antimicrobial properties.

Hence, a further aspect of the present invention is directed to a composition essentially consisting of
a) shaped transition metal particles, prepared as described above, and
b) a thermoplastic or crosslinkable polymer.

The term "essentially consisting of" means that both components make up at least 90 wt. %, based on the total weight of components a) and b), preferably at least 95 wt. %.

The thermoplastic or crosslinkable polymer is preferably transparent or translucent. The amount of light transmitted through the present materials, i.e. degree of translucency or transparency, mainly depends on well known parameters such as particle loading, further additives used, haze level of the polymer matrix and thickness of the material. The present materials usually are at least 60% translucent in each part of the visible range (400-750 nm); preferred materials have good transparency and are especially selected from clear-transparent sheets and films of thickness less than 10 mm (e.g. 0.01 to 5 mm) or thick sheets of all possible dimensions.

Preferred materials further share one or more of the following advantageous properties:
a full solar radiation transmittance (340-1800 nm) of less than 60%,
a low haze value and
a full visible light transmittance (400-750 nm) of more than 60%.

A wide variety of polymers may be used. Examples of plastic resins include polycarbonate (PC) or a coating or coextruded layer on polycarbonate, polyesters, polyolefins, halogenated polymers, aromatic homopolymers and copolymers derived from vinyl aromatic monomers and graft copolymers thereof, acrylics and polyvinylacetales including blends, alloys and copolymers.

Polymers useful within the present invention include also the following ones:

1. Polymers of monoolefins and diolefins, e.g. polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

2. Mixtures of the polymers mentioned under 1), for example mixtures of polypropylene with polyisobutylene, polypropylene with polyethylene (e.g. PP/HDPE, PP/LDPE) and mixtures of different types of polyethylene (e.g. LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LOPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, wherein the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; wherein atactic polymers are preferred. Step-reoblock polymers are also included.

5. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile (SAN), styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methylacrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 4), for example the copolymer mixtures known as ABS, MBS, ASA or AES polymers.

7. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride (PVC), polyvinylidene chloride, polyvinyl fluoride, polyvinylidene fluoride (PVDF), as well as copolymers thereof such as vinyl chloride/vinylidene chloride, vinyl chloride/vinyl acetate or vinylidene chloride/vinyl acetate copolymers.

8. Polymers derived from α,β-unsaturated acids and derivatives thereof such as polyacrylates and polymethacrylates; polymethylmethacrylates (PMMA), polyacrylamides and polyacrylonitriles, impact-modified with butyl acrylate.

9. Copolymers of the monomers mentioned under 8) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

10. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

11. Polyesters derived from dicarboxylic acids and diols and/or from hydroxycarboxylic acids or the corresponding lactones, for example polyethylene terephthalate (PET), polybutylene terephthalate (PBT), poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

12. Polycarbonates and polyester carbonates.

13. Conductive polymers, such as polypyrrol, polythiophene, polyaniline, polyacetylene and derivatives thereof.

Incorporation of the shaped particles into the polymer matrix leads to plastic articles which are highly transparent; they may be colorless (e.g. for clear glazings or films) or colored, e.g. by addition of a pigment or mixture of pigments, e.g. for applications wherein suitable light filtering or sun screening is desired. The present shaped particles allow high loading, giving access to high heat shielding effects as well as to high antimicrobial activity.

The amount of the shaped particles is preferably of from 0.0001 to 90%, more preferably 0.0003 to 70%, most preferably 0.0003 to 10%, especially 0.0003 to 5% by weight, based on the total weight of the polymer composition. In case of silver the amount is typically from 0.0005 to 70%, preferably from 0.005 to 10% by weight, based on the total weight of the polymer composition.

The instant composition may also be used for the preparation of plastic films, fibers or articles that comprise the shaped particles.

It is also possible to incorporate the instant shaped particles into a curable/crosslinkable coating composition, which is applied to a transparent substrate, such as glass, one of the polymers mentioned above or opaque substrates, e.g. paper. Examples for curable/crosslinkable coatings are given below.

1. Crosslinked polymers derived from aldehydes on the one hand and phenols, ureas and melamines on the other hand, such as phenol/formaldehyde resins, urea/formaldehyde resins and melamine/formaldehyde resins.

2. Unsaturated polyester resins derived from copolyesters of saturated and unsaturated dicarboxylic acids with polyhydric alcohols and vinyl compounds as crosslinking agents, and also halogen-containing modifications thereof of low flammability.

3. Crosslinkable acrylic resins derived from substituted acrylates, for example epoxy acrylates, urethane acrylates or polyester acrylates.

4. Alkyd resins, polyester resins and acrylate resins crosslinked with melamine resins, urea resins, isocyanates, isocyanurates, polyisocyanates or epoxy resins.

5. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

In general, thermoplastic polymers are preferred. Preferably, the thermoplastic or crosslinkable polymer is polycarbonate, a coating or coextruded layer on polycarbonate, polymethylmethacrylate, polyethylene terephthalate (PET, PET-G), polyvinylchloride, polyvinylidene fluoride, transparent ABS, styrene-acrylonitrile copolymer, polypropylene, polyethylene, as well as blends, alloys and copolymers thereof. Among these polymers polyacrylates, in particular polymethylmethacrylate, polycarbonate and polyvinylacetal, in particular polyvinylbutyral, are most preferred.

The composition described above may contain as further components one or more conventional additives selected from antioxidants, flame retardants, clarifiers, UV absorbers and/or sterically hindered amines, pigments and NIR absorbers, such as antimony tin oxide (ATO), indium tin oxide (ITO), $LaB_6$, $WO_x$, doped $WYO_x$, ZnO or doped ZnYO, cyanines, phthalocyanines, Lumogen 788 or other quaterrylenes, dithiolenes and other metal complexes.

Also, further antimicrobial agents may be present in the composition, for instance di- or trihalogeno-hydroxydiphenylethers such as Diclosan or Triclosan, 3,5-dimethyl-tetrahydro-1,3,5-2H-thiodiazin-2-thione, bis-tributyltinoxide, 4.5-dichlor-2-n-octyl-4-isothiazolin-3-one, N-butyl-benzisothiazoline, 10.10'-oxybisphenoxyarsine, zinc-2-pyridinthiol-1-oxide, 2-methylthio-4-cyclopropylamino-6-(α,β-dimethylpropylamino)-s-triazine, 2-methylthio-4-cyclopropylamino-6-tert-butylamino-s-triazine, 2-methylthio-4-ethylamino-6-(α,β-dimethylpropylamino)-s-triazine, 2,4,4'-trichloro-2'-hydroxydiphenyl ether, IPBC, carbendazim or thiabendazole.

Further additives useful may be selected from the materials listed below, or mixtures thereof:
1. Antioxidants:
1.1. Alkylated monophenols, for example 2,6-di-tert-butyl-4-methylphenol,
1.2. Alkylthiomethylphenols, for example 2,4-dioctylthiomethyl-6-tert-butylphenol,
1.3. Hydroquinones and alkylated hydroquinones, for example 2,6-di-tert-butyl-4-methoxy-phenol, 2,5-di-tert-butylhydroquinone,
1.4. Tocopherols, for example α-tocopherol,
1.5. Hydroxylated thiodiphenyl ethers, for example 2, 2'-thio-bis(6-tert-butyl-4-methylphenol),
1.6. Alkylidenebisphenols, for example 2, 2'-methylenebis(6-tert-butyl-4-methylphenol),
1.7. O-, N- and S-benzyl compounds, for example 3,5,3',5'-tetra-tert-butyl-4,4'-dihydroxydibenzyl ether,
1.8. Hydroxybenzylated malonates, for example dioctadecyl-2,2-bis(3,5-di-tert-butyl-2-hydroxybenzyl)malonate, 1.9. Aromatic hydroxybenzyl compounds, for example 1,3,5-tris(3,5-di-tert-butyl-4-hydroxybenzyl)-2,4,6-trimethylbenzene,
1.10. Triazine compounds, for example 2,4-bis(octylmercapto)-6-(3,5-di-tert-butyl-4-hydroxy-anilino)-1,3,5-triazine,
1.11. Benzylphosphonates, for example dimethyl-2,5-di-tert-butyl-4-hydroxybenzylphosphonate,
1.12. Acylaminophenols, for example 4-hydroxylauranilide,
1.13. Esters of β-(3,5-di-tert-butyl-4-hydroxyphenyl)propionic acid with mono- or polyhydric alcohols,
1.14. Esters of β-(5-tert-butyl-4-hydroxy-3-methylphenyl)propionic acid with mono- or polyhydric alcohols,
1.15. Esters of β-(3,5-dicyclohexyl-4-hydroxyphenyl)propionic acid with mono- or polyhydric alcohols,
1.16. Esters of 3,5-di-tert-butyl-4-hydroxyphenyl acetic acid with mono- or polyhydric alcohols,
1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide,
1.18. Ascorbic acid (vitamin C),
1.19. Aminic antioxidants, for example N,N'-di-isopropyl-p-phenylenediamine.
2. UV absorbers and light stabilizers:
2.1. 2-(2'-Hydroxyphenyl)benzotriazoles, for example 2-(2'-hydroxy-5'-methylphenyl)-benzo-triazole,
2.2. 2-Hydroxybenzophenones, for example the 4-hydroxy derivatives,
2.3. Esters of substituted and unsubstituted benzoic acids, for example 4-tert-butyl-phenyl salicylate,
2.4. Acrylates, for example ethyl α-cyano-β,β-diphenylacrylate,
2.5. Nickel compounds, for example nickel complexes of 2,2'-thio-bis[4-(1,1,3,3-tetramethyl-butyl)phenol],
2.6. Sterically hindered amines, for example bis(2,2,6,6-tetramethyl-4-piperidyl)sebacate.
2.7. Oxamides, for example 4, 4'-dioctyloxyoxanilide,
2.8. 2-(2-Hydroxyphenyl)-1,3,5-triazines, for example 2,4-bis(2,4-dimethylphenyl)-6-(2-hydroxy-4-octyloxyphenyl[or-4-dodecyl/tridecyloxyphenyl])-1,3,5-triazine.
3. Metal deactivators, for example N,N'-diphenyloxamide.
4. Phosphites and phosphonites, for example triphenyl phosphite.
5. Hydroxylamines, for example N,N-dibenzylhydroxylamine.
6. Nitrones, for example, N-benzyl-alpha-phenylnitrone.
7. Thiosynergists, for example dilauryl thiodipropionate.
8. Peroxide scavengers, for example esters of β-thiodipropionic acid.
10. Basic co-stabilizers, for example melamine.
11. Nucleating agents, for example inorganic substances, such as talcum, metal oxides.
12. Fillers and reinforcing agents, for example calcium carbonate, silicates.
13. Other additives, for example plasticisers, lubricants, emulsifiers, pigments, rheology additives, catalysts, flow-control agents, optical brighteners, flameproofing agents, antistatic agents and blowing agents.
14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384.

For more details on stabilizers and additives useful, see also list in paragraphs [0132] to [0174] of US 2006/252857, which is hereby incorporated by reference.

One or more of these further additives are usually contained in an amount of from 0.01 to about 20% by weight, based on the total weight of the composition, often from about 0.1 to 10% by weight, preferably from 0.1 to 5.0% by weight. Important are, for example, antioxidants (e.g. phenolic antioxidants and/or phosph(on)ites listed above) and, for many applications, flame retardants. Clarifiers/nucleating agents may be added to provide or improve transparency, especially in polyolefin compositions. Especially preferred is the combination of the present shaped particles with light stabilizers such as UV absorbers and/or sterically hindered amines (HALS).

In another embodiment of the invention, further to the shaped particles there may be present in the composition as additional components solid nano-scaled particles of a thickness of less than 200 nm, which consist of an oxide of zinc and/or a nitride of a transition metal of group III, IV, V, VI of the periodic system, each of which is doped with one or more of the elements belonging to main groups III and IV of the periodic system, or consist of undoped vanadium nitride or scandium nitride.

In particular, the nitride is selected from nitrides of scandium, yttrium, lanthanum including the lanthanides, titanium, zirconium, hafnium, vanadium, niobium, tantalum, chromium, molybdenum and wolfram; the doping elements are selected from boron, aluminum, gallium, indium, thallium, carbon, silicon, germanium, tin and lead.

Preferred examples of the particles useful in the invention are aluminum doped zinc oxide (AZO), indium doped zinc oxide (IZO), gallium doped zinc oxide (GaZO), aluminum doped titanium nitride (AlTiN), indium doped titanium nitride (InTiN), gallium doped titanium nitride (GaTiN), aluminum doped vanadium nitride (AlVN), indium doped vanadium nitride (InVN), gallium doped vanadium nitride (GaVN), vanadium nitride (VN), aluminum doped scandium nitride (ALScN), indium doped scandium nitride (InScN), gallium doped scandium nitride (GaScN) and scandium nitride (ScN).

Normal zinc oxide shows no absorption in the NIR region: doping transforms the non-conducting material in a conducting material which shows absorption in the NIR region.

Regarding the doping level, the present oxides and nitrides may be represented by the formulae:

$$X_a Zn_b O_c \quad \text{(II)}$$

$$X_a Y_d N_e \quad \text{(III)}$$

wherein X is one or more of the elements belonging to main group III and/or IV of the periodic system, Y is a transition metal belonging to group III, IV, V and/or VI (see above for more details of elements belonging to these groups); indices a-e indicate the abundance of the components, with formula (II) obeying to the condition a<b<c, and formula (III) obeying to the condition a<d less or equal to e. Doping levels, for example of Al, Ga and/or In in ZnO or TiN, often are in the range of from 0.01 to about 20, especially from 0.1 to 10% by weight of the final particle material. The nanoparticles are solid and often, but not necessarily, crystalline. They may be prepared according to methods known in the art, e.g. using sputtering, thermal evaporation, chemical vapor deposition (CVD), spray pyrolysis and sol-gel processes; the materials often are commercially available.

Preferred materials are zinc oxide doped with Al, Ga, In; titanium nitride doped with Al; vanadium nitride or especially scandium nitride; or vanadium nitride or especially scandium nitride doped with Al, Ga, In. Of special importance is Ga or especially Al as doping element.

Also of special interest are the following materials: ATO (Tin oxide doped with Antimony), ITO (Tin oxide doped with Indium), AZO (Zinc oxide doped with Aluminum), IZO (Zinc oxide doped with Indium), GaZO (Zinc oxide doped with Gallium), $LaB_6$ and doped tungsten oxides ($YWO_x$).

Such doped oxides and their use in IR shielding applications are, for example, described in US 2003/0122114 and U.S. Pat. No. 7,074,351.

One or more of these materials may be used.

The nanoparticles of the oxides or nitrides used as further components within the present invention are found not to interact with light as reflectors but as absorbers (scattering is present but gives only a small contribution).

Plastic materials, especially films of the present invention, containing polymers and shaped particles, as described above, advantageously may also be used in technical application fields such as architectural glazing, glazing in building and construction, automotive glazing, transportation glazing, agricultural films and structures. The materials may be solid sheets, monolithic sheets, twin-wall sheets, multi-wall sheets, flat sheets, corrugated sheets, films, oriented or mono- or biaxially oriented films, lamination films, capstock films.

Specific application fields include wintergarden and veranda buildings, facades, skylights, pool covers and enclosures, roof structures, vaults, walkways, shelters, signage, interior and exterior design elements, sun shades, side window, rear window, panorama roof, greenhouses.

Main applications are heat-shielding, light management, heat management, energy management, solar control; also of importance are laser welding, security features, marking, tracers, heat transfer and NIR curing of coatings.

The shaped particles of the invention and optional further additives may be added to the polymer material individually or mixed with one another. If desired, the individual components of an additive can be mixed with one another before incorporation into the polymer, for example, by dry blending, compaction or in the melt.

In another aspect, the present invention provides a solid paste of shaped metal/polymer nanocomposites.

The incorporation of the shaped particles of the invention and optional further additives into the polymer is carried out by known methods such as dry blending in the form of a powder, or wet mixing in the form of solutions, dispersions or suspensions, for example, in an inert solvent, water or oil, e.g. mineral oil or silicone oil. The shaped particles and optional further additives may be incorporated, for example, before or after molding or also by applying the dissolved or dispersed additive or additive mixture to the polymer material, with or without subsequent evaporation of the solvent. They may be added directly into the processing apparatus (e.g. extruders, internal mixers, etc), e.g. as a dry mixture or powder or as solution or dispersion or suspension or melt.

The addition of the shaped particles optionally with further additives or as additive blend to the thermoplastic polymer can be carried out in all customary mixing devices in which the polymer is melted and mixed with the additives. Suitable devices are known to those skilled in the art. They are predominantly mixers, kneaders and extruders. The process is preferably carried out in an extruder by introducing the additive during processing.

Particularly preferred processing devices are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in Handbuch der Kunststoffextrusion, vol. 1 Grundlagen, Editors F. Hensen, W. Knappe, H. Potente, 1989, pp. 3-7, ISBN: 3-446-14339-4 (Vol. 2 Extrusionsanlagen 1986, ISBN 3-446-14329-7). For example, the screw length is 1-60 screw diameters, preferably 20-48 screw diameters. The rotational speed of the screw is preferably 1-800 rotations per minute (rpm), more preferably 25-400 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The shaped particles and optional further additives can also be added to the polymer in the form of a masterbatch ("concentrate"), which contains all the components together in a concentration of, for example, about 1% to about 95%, preferably 1% to about 90% and more preferably 2% to about 80% by weight, based on the weight of the polymer composition. The transition metal content is about 8 ppm to 80% by weight, based on the weight of the polymer composition. The polymer must not be necessarily of identical structure than the polymer where the additives are added finally. In such operations, the polymer can be used in the form of powder, granules, solutions, suspensions or in the form of lattices.

Incorporation can take place prior to or during the shaping operation, or by applying the dissolved or dispersed shaped metal particles to the polymer, with or without subsequent evaporation of the solvent. The shaped metal particles and optional further additives may also be added before, during or directly after the polymerization of the corresponding monomers or prior to crosslinking. In this context the shaped metal particles may be added as it is or else in encapsulated form (for example in waxes, oils or polymers).

The materials containing the shaped particles of the invention described herein can be used for the production of moldings, rotomolded articles, injection molded articles, blow molded articles, films, tapes, surface coatings, woven and nonwoven fabrics and the like.

Yet another subject of the invention is the use of shaped transition metal particles, prepared according to the method, as described above, as an IR, especially NIR, absorber in heat shielding architectural or automotive glazing or agricultural films, laser welding, laser printing or security printing.

Further, the shaped particles of the invention may be used as a NIR or IR absorbing curing agent for coatings, as an additive in conductive formulations, e.g. conductive inks, in particular as a component of low-sintering conductive inks, in printing inks, coating compositions or for sensing organic and/or inorganic compounds.

Accordingly, the invention relates to a printing ink or coating composition comprising shaped transition metal particles, prepared as described above.

The shaped particles of the invention may also be used in any fields in which the development and proliferation of microorganisms must be suppressed.

Hence, a further aspect of the present invention is directed to antimicrobial products or compositions comprising the afore-mentioned shaped particles in an antimicrobially effective amount.

The plastic films, fibers and articles of the present invention are advantageously employed for applications that require long-term hygienic activity on the surface, e.g. medical devices, hand rails, door handles, mobile phones, keyboards etc. The shaped particles of the invention are suitable also for treating, especially imparting antimicrobial properties to or preserving, plastics. The antimicrobial plastic films, fibers and articles of the present invention are used, for example, in hospitals, households, public institutions, ventilation systems, air cleaning and air conditioning systems and waste disposal systems. Plastic articles exposed to outdoor weathering that may have incorporated therein shaped particles of the present invention are, for example, waste containers, swimming pool equipment, outdoor swing set equipment, slides, playground equipment, water tanks, out door furniture, and the like, and stadium seats.

Accordingly, the shaped particles of the invention are useful for the disinfection and general antimicrobial treatment, such as deodorising, of the skin, mucous membrane and hair, preferably for the disinfection of hands and wounds.

The shaped particles of the invention may be utilized as an antimicrobial agent in various product forms or compositions for personal and household care use or for industrial and hospital applications including, but not limited to, cosmetic compositions for skin and hair care, for example, lotions; creams; oils; gels; powders; wipes; deodorants like sprays, sticks and roll-ons; cleansers like shower gels; bath additives; liquid and solid soaps (based on synthetic surfactants and salts of saturated and/or unsaturated fatty acids); aqueous or alcoholic solutions, e.g. cleansing solutions for the skin; moist cleaning cloths; hand sanitizers; shampoos; rinses; etc.;

oral hygiene compositions, for example, in the form of a gel, a paste, a cream or an aqueous preparation (mouthwash);

hard surface cleaners, e.g., disinfectant sprays, liquids, or powders; dish or laundry detergents (liquid or solid), floor waxes, glass cleaners, etc.; and industrial and hospital applications (e.g., sterilization of instruments, medical devices, gloves; contact lenses, contact lense cases, contact lense storage solutions, contact lense cleaning solutions).

A further aspect of the present invention is therefore an antimicrobial cosmetic composition comprising shaped transition metal particles, especially as described above, in an antimicrobially effective amount and one or more components selected from the group consisting of cosmetically tolerable carriers and adjuvants.

The cosmetic composition of the invention may comprise the shaped particles in an antimicrobially effective amount which is usually of from 0.0001 to 15% by weight, preferably 0.0003 to 2% by weight, based on the total weight of the composition. Silver, gold, copper, zinc particles and combinations thereof are preferred.

Depending upon the form of the cosmetic composition, it comprises, in addition to the shaped particles of the invention, one or more further components as cosmetically tolerable carriers and adjuvants, for example sequestering agents, colorings, perfume oils, thickening or solidifying agents (consistency regulators), emollients, UV-absorbers, skin protective agents, antioxidants, additives that improve the mechanical properties, such as dicarboxylic acids and/or aluminium, zinc, calcium or magnesium salts of $C_{14}$-$C_{22}$ fatty acids, and, optionally, preservatives. Additionally the cosmetic composition of the invention may contain one or more further antimicrobial agents, as listed above.

The personal care preparation according to the invention may be in the form of a water-in-oil or oil-in-water emulsion, an alcoholic or alcohol-containing formulation, a vesicular dispersion of an ionic or non-ionic amphiphilic lipid, a gel, a solid stick, an aerosol formulation or a surfactant based formulation, such as a soap or skin cleanser.

As a water-in-oil or oil-in-water emulsion, the cosmetically tolerable adjuvant contains preferably from 5 to 50% of an oil phase, from 5 to 20% of an emulsifier and from 30 to 90% water. The oil phase may comprise any oil suitable for cosmetic formulations, for example one or more hydrocarbon oils, a wax, a natural oil, a silicone oil, a fatty acid ester or a fatty alcohol. Preferred alcohols useful in personal care preparations are ethanol, isopropanol, propylene glycol, hexylene glycol, glycerol and sorbitol.

Any conventionally usable emulsifier can be used for the cosmetic composition of the invention, for example, one or more ethoxylated esters of natural derivatives, e.g. polyethoxylated esters of hydrogenated castor oil; or a silicone oil emulsifier, e.g. a silicone polyol; an optionally ethoxylated fatty acid soap; an ethoxylated fatty alcohol; an optionally ethoxylated sorbitan ester; an ethoxylated fatty acid; or an ethoxylated glyceride.

The preparation of the cosmetic composition can be effected by physically mixing the shaped particles with the auxiliary by customary methods, for example by simply stirring the individual components together. The particles may suitably be incorporated into the cosmetic composition as a dispersion in one or more components of the final composition.

The following represents examples of various formulations containing the shaped particles of the invention. Obviously, these are simple, basic formulations only and a wide variety of similar formulations are known in the art into which the present shaped particles at various concentrations are readily incorporated.

An antimicrobial soap has, for example, the following composition: 0.0003 to 5% by weight of shaped particles, 0.3 to 1% by weight of titanium dioxide, 1 to 10% by weight of stearic acid, soap base ad 100%, e.g. a sodium salt of tallow fatty acid or coconut fatty acid, or glycerol.

A deodorant has, for example, the following composition: 0.0003 to 5% by weight of shaped particles, 60% by weight ethanol, 0.3% by weight perfume oil, and water ad 100%.

A further aspect of the invention relates to a method of protecting plastics, coatings, household or personal care products and compositions, such as cosmetic compositions against the action of microorganisms which comprises adding an effective amount of shaped particles of the invention to the plastic composition, coating composition, household or personal care composition.

The shaped particles of the invention are also suitable for treating, especially preserving, textile fibre materials. Such materials are undyed and dyed or printed fibre materials, e.g. of silk, wool, polyamide or polyurethanes, and especially cellulosic fibre materials of all kinds. Such fibre materials are, for example, natural cellulose fibres, such as cotton, linen, jute and hemp, as well as cellulose and regenerated cellulose.

Paper, for example paper used for hygiene purposes, may also be provided with antimicrobial properties using the present shaped particles.

It is also possible for nonwovens, e.g. nappies/diapers, sanitary towels, panty liners, and cloths for hygiene and household uses, to be provided with antimicrobial properties in accordance with the invention.

Accordingly, one aspect of the invention relates to an antimicrobial product, comprising shaped transition metal particles, prepared as described above, wherein the product is selected from the group consisting of personal care products such as cosmetic compositions for skin and hair care, like lotions, creams, oils, gels, powders, wipes, deodorants, cleansers, bath additives, liquid and solid soaps, aqueous and/or alcoholic cleansing solutions, moist cleaning cloths, hand sanitizers, shampoos, rinses, and oral hygiene products like toothpastes or mouthwashes; household care products, such as hard surface cleaners, dish detergents, laundry detergents, glass cleaners and floor waxes; and industrial and hospital products, such as medical devices and gloves, a contact lense, a contact lense case, a contact lense storage solution, a contact lense cleaning solution; textile articles; fiber materials; paper materials; paper coatings; adhesives; coatings and paints.

One further aspect of the invention relates to an antimicrobial cosmetic composition comprising platelet-shaped transition metal particles, especially prism-shaped platelets, and cosmetically tolerable carriers and/or adjuvants in an antimicrobially effective amount.

Moreover, the invention relates to the use of platelet-shaped, especially trigonal and/or hexagonal prism-shaped, transition metal particles as an IR absorbing and/or antimicrobial agent in a cosmetic composition.

Preferably, the platelet-shaped transition metal particles are shaped silver particles, in particular prepared as described hereinbefore.

It has been found that the present method provides the preparation of shaped transition metal particles on an industrial suitable scale. The starting concentration of the metal salt used is essentially higher than that described in prior art which leads to effectively less amounts of waste material.

A high concentration of the transition metal salt in step a), up to 50 mM or higher, even up to 500 mM, may be achieved, also highly concentrated dispersions and pastes of shaped particles may be manufactured without agglomeration. The concentrations which may be achieved, may be at least 20% by weight, based on the total weight of the dispersion, preferably up to 97% by weight. In addition, the monodispersity of the shaped particles in the dispersion may be increased and the spectral profile of the dispersion may effectively be controlled. Handling and isolation of the resulting platelets as a dispersion may greatly be improved. Platelets may be prepared which have an absorption maximum of 900 nm or higher, preferably of 1000 nm or higher.

Another advantage is that the shaped metal particles can be easily and homogenously dispersed in various organic materials essentially without any aggregation and agglomeration of the particles, wherein undesired drawbacks of transparency of polymeric materials can be avoided. Moreover, the application of energy for incorporation of the shaped particles in the material is less. The possibility to have homogeneous dispersions in methylmethacrylate allows using the dispersion as such in order to radically polymerize the monomer to PMMA for the manufacture of the final product.

The resulting plastic articles or coatings are high in transparency and the products are almost colorless or slightly bluish which is acceptable for such products.

The method of the invention provides shaped particles which preserve their special morphology and maintain their optical properties during the dispersion in any organic matter.

The shaped particles exhibit strong IR absorbing, especially strong NIR absorbing properties.

The plastic articles, films and fibers comprising shaped transition metal particles of the present invention exhibit high long-term antimicrobial activity at the surface.

All definitions and preferences given above for the method apply equally for the other aspects of the invention.

FIG. 1 describes schematically the method of manufacturing shaped silver particles.

Figure 2A:
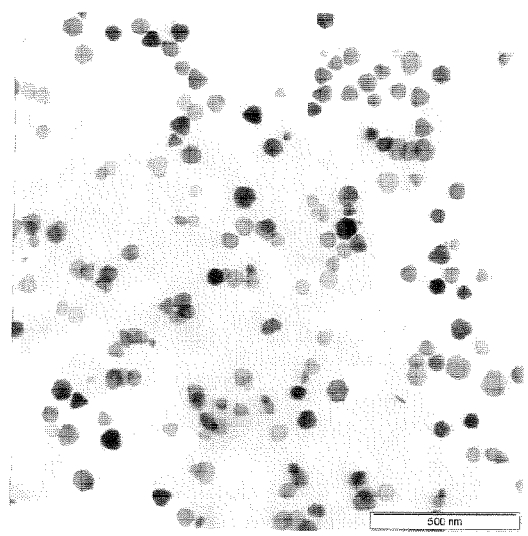
Figure 2B:
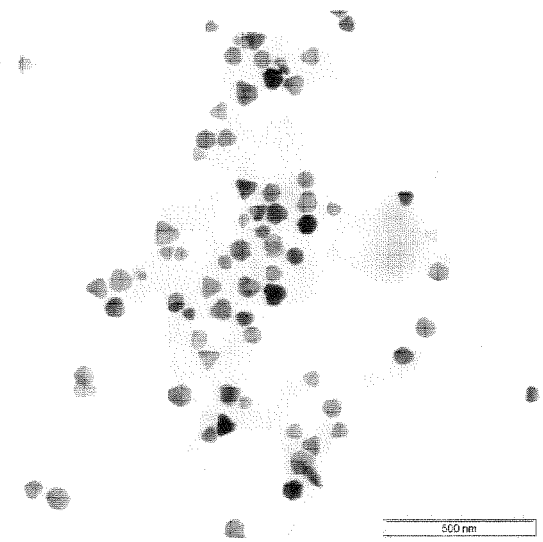
Figure 2C:
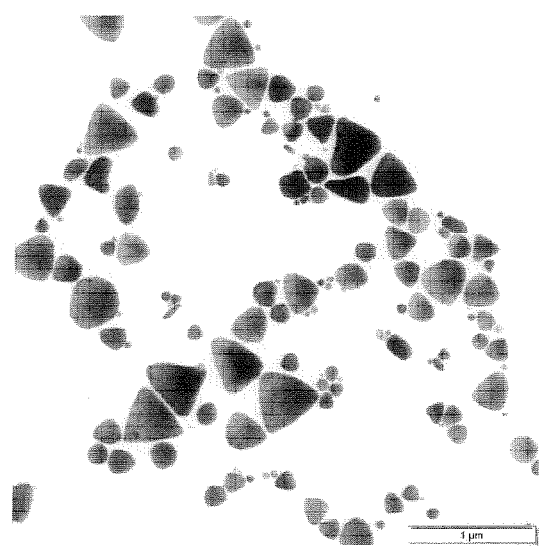
Figure 2D:
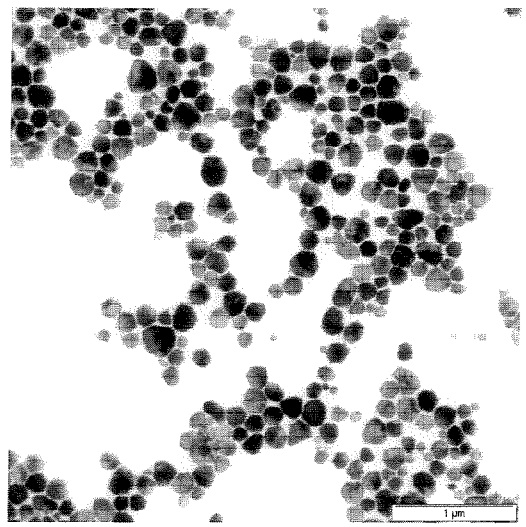

FIG. 2a-c present examples of TEM (transmission-electron-microscopy) images of shaped silver particles. FIG. 2a refers to particles prepared according to Example 1, FIG. 2b refers to particles prepared according to Example 13, FIG. 2c refers to particles prepared according to Example 14, and FIG. 2d refers to particles prepared according to Example 17.

Figure 3:
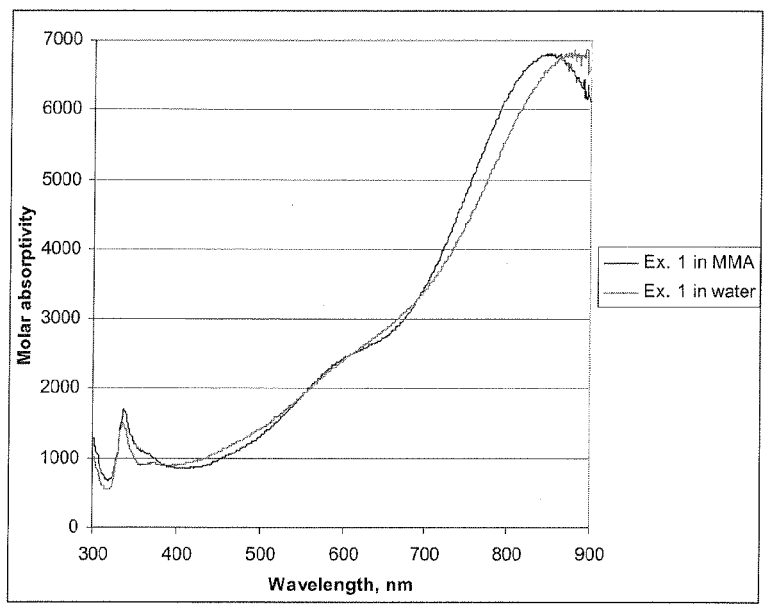

FIG. 3 presents absorption spectra of shaped silver particles. The figure illustrates the restoration of optical properties after dispersing shaped silver particles in methylmethacrylate.

The following examples are for illustrative purposes only and are not to be construed to limit the instant invention in any manner whatsoever. Unless otherwise indicated, parts and percentages mentioned in the description or claims are by weight, and room temperature denotes a temperature of the range 20-25° C.

EXAMPLES

General Procedure for the Preparation for Examples 1 to 16

In a round-bottom flask equipped with efficient stirring bar de-ionized water, optionally capping agent, dispersant and transition metal salt are mixed under ambient atmosphere, and the mixture is cooled to 0° C. An aqueous solution of a reducing agent is added, and the resulting dispersion of transition metal particles is stirred at 0° C. for 1 hour followed by 1 hour at 20° C. An aqueous solution of peroxide is slowly added until the desired spectral profile is reached.

Example 1

1 g of EFKA 4580 (40% by weight solution in water) are dissolved to 79 ml of de-ionized water in a 250 ml round bottom flask equipped with an efficient stirring bar. 340 mg (2 mmol) of $AgNO_3$ are added, the obtained solution is cooled to 0° C., and 20 ml of an ice cold freshly prepared aqueous solution of $NaBH_4$ (200 mM) are added in one portion with vigorous stirring. The resulting brown dispersion is stirred at 0° C. for 1 hour, warmed to 20° C. within 5 minutes (min) and stirred at this temperature for 1 hour. 20 ml of $H_2O_2$ (50% w/w solution in water) is added at a rate of 0.1 ml/min to obtain a dark-blue dispersion of silver platelets.

The Examples 2 to 16 are carried out according to the procedure of Example 1 and the conditions listed in Tables 1 and 2. Each concentration of Table 1 refers to the concentration of the single components before addition of peroxide.

TABLE 1

| Ex. | $AgNO_3$ conc. [mM] | Dispersing agent | conc. w/w % | Capping agent | conc. [mM] | Reducing agent | conc. [mM] |
|---|---|---|---|---|---|---|---|
| 1 | 20 | EFKA 4580 | 0.4 | — | — | $NaBH_4$ | 40 |
| 2 | 2.5 | PVP[a] | 0.05 | trisodium citrate | 16 | $NaBH_4$ | 8.0 |
| 3 | 2.5 | PVP | 0.05 | trisodium citrate | 26 | $NaBH_4$ | 8.0 |
| 3a | 2.5 | PVP | 0.05 | trisodium citrate | 26 | $NaBH_4$ | 8.0 |
| 4 | 2.5 | PVP | 0.05 | trisodium citrate | 20 | $NaBH_4$ | 6.0 |
| 5 | 3.0 | PVP | 0.15 | trisodium citrate | 30 | $NaBH_4$ | 9.0 |
| 6 | 2.5 | PVP | 0.1 | trisodium citrate | 2.0 | $NaBH_4$ | 8.0 |
| 6b | 2.5 | PVP | 0.1 | trisodium citrate | 2.0 | $NaBH_4$ | 8.0 |
| 7 | 3.0 | PVP | 0.1 | trisodium citrate | 1.0 | $NaBH_4$ | 8.0 |
| 8 | 4.0 | PVP | 0.1 | trisodium citrate | 1.0 | $NaBH_4$ | 12 |
| 9 | 5.0 | PVP | 0.1 | trisodium citrate | 1.0 | $NaBH_4$ | 12 |
| 10 | 10 | PVP | 0.1 | trisodium citrate | 2.0 | $NaBH_4$ | 20 |
| 11 | 10 | PSS[b] | 0.09 | trisodium citrate | 1.0 | $NaBH_4$ | 20 |
| 12 | 20 | PVP | 0.2 | trisodium citrate | 1.0 | $NaBH_4$ | 40 |
| 13 | 20 | Example 20 | 1.75 | — | — | $NaBH_4$ | 40 |
| 14 | 20 | EFKA 4580 | 1.6 | — | — | $NaBH_4$ | 40 |
| 15 | 30 | EFKA 4580 | 0.4 | — | — | $NaBH_4$ | 60 |
| 16 | 30 | EFKA 4580 | 0.8 | — | — | $NaBH_4$ | 60 |

[a]polyvinylpyrrolidone;
[b]sodium salt of polystyrene sulfonic acid

TABLE 2

| Ex. | Stirring time before $H_2O_2$ addition [min] | $H_2O_2$ conc. w/w % | $H_2O_2$ rate [ml/min] | $H_2O_2$ volume [ml] | Absorption maximum [nm][l] | $\epsilon_{max}^m$ $l*mol^{-1}/cm^{-1}$ |
|---|---|---|---|---|---|---|
| 1 | 120 | 50 | 0.1 | 20 | 895 | 6880 |
| 2 | 180 | 1.0 | 0.33 | 40 | >900 | 4250 |
| 3 | 180 | 1.0 | 0.33 | 40 | 758 | 2970 |
| 3a | 180 | 1.0 | $\infty$[c] | 40 | 405 | n.d.[d] |
| 4 | 180 | 1.0 | 0.165 | 40 | 889 | 4740 |
| 5 | 60 | 3.4 | 0.33 | 80 | >900 | 5210 |
| 6 | 120 | 3.4 | 0.33 | 40 | >900 | 6080 |
| 6b | 0[e] | 3.4 | $\infty$ | 40 | 410 | n.d. |
| 7 | 120 | 30 | 0.1 | 17 | 896 | 6720 |
| 8 | 120 | 30 | 0.1 | 17 | 894 | 5460 |
| 9 | 120 | 30 | 0.1 | 20 | 890 | 5790 |
| 10 | 120 | 30 | 0.1 | 24 | >900 | 5420 |
| 11 | 120 | 30 | 0.1 | 15 | >900 | 5980 |
| 12[f] | 120 | 30 | 0.1 | 2 | — | — |
| 13 | 120 | 30 | 0.1 | 22 | >900 | 5140 |
| 14 | 120 | 50 | 0.1 | 40 | >900 | 3900 |
| 15 | 120 | 30 | 0.1 | 25 | >900 | 2470 |
| 16 | 120 | 30 | 0.1 | 30 | >900 | 3740 |

[c]$H_2O_2$ is added in one portion after adding the reducing agent;
[d]not determined;
[e]$H_2O_2$ is added in one portion before adding the reducing agent;
[f]coagulation of seeds

Example 17

20 g of the copolymer prepared according to Example 2 from WO2004/045755 (40 w/w dispersion in water), 20 g of ethyleneglycol and 6 g of MPEG-5000-thiol are dissolved in 1950 ml of de-ionized water in a thermostated 10 l reactor, equipped with an efficient stirrer. After cooling to −1° C., 10.2 g (60 mmol) of $AgNO_3$ are added and the obtained solution is gently stirred for 15 min. 4.54 g (120 mmol) of $NaBH_4$ are dissolved in 1 l of de-ionized water in a separate vessel and cooled to 0° C. This solution is rapidly added in one portion to the above solution of $AgNO_3$ with vigorous stirring (500 rpm). The reaction mixture is vigorously stirred (500 rpm) for 5 min at 0° C. and then warmed up to 20° C. with gentle stirring over 1 h. 150 ml of $H_2O_2$ (50% w/w solution in water) is added at a rate of 3 ml/min to the mixture with vigorous stirring (350 rpm) to obtain a dark-blue dispersion of silver platelets. Water is evaporated to the volume of 200 ml, and the residual dispersion is centrifuged at 8000 G for 30 min. The supernatant is decanted; the precipitate is rinsed with de-ionized water (2×40 ml) and re-dispersed in 200 ml of 1,4-dioxan under ultra-sonication. The dispersion is centrifuged at 8000 G, the supernatant is discarded and the precipitate is re-dispersed in a desired solvent to obtain a dispersion of 6.3 g of silver platelets.

Example 18

Two solutions are prepared:
Solution A:
7 g of the copolymer prepared according to Example 2 from WO2004/045755 (40% w/w dispersion in water) and 1.2 g of MPEG-5000-thiol are dissolved in 20 ml of de-ionized water and cooled to 0° C. Then, a solution of 2.04 g (12 mmol) of $AgNO_3$ in 23 ml of de-ionized water is added with stirring, and the resulting mixture is cooled to 0° C.
Solution B:
0.908 g (24 mmol) of $NaBH_4$ and 0.07 ml (ca. 1.15 mmol) of 28% w/w ammonia solution in water are dissolved in 49 ml of de-ionized water and cooled to 0° C.
Synthesis:
Solutions A and B are pumped with equal flow rates (30 ml/min) into a three-way connector (inner diameter of the inlets 1 mm). The resulting dispersion of spherical Ag particles is continuously drained from the third outlet (inner diameter 3 mm) of connector into a 1 l flask, pre-cooled to 0° C., containing 0.05 ml of TEGO Foamex 1488 defoamer and stirred for 10 minutes at this temperature. The mixture is then heated to 45° C. and treated with 20 ml of $H_2O_2$ (50% w/w solution in water) at a rate of 0.6 ml/min with vigorous stirring to obtain a dark-blue dispersion of silver platelets. The dispersion is centrifuged at 8000 G for 30 min, followed by decanting the supernatant and rinsing the precipitate with de-ionized water (2×40 mL). The precipitate is re-dispersed in 200 ml of 1,4-dioxan under ultra-sonication. The dispersion is centrifuged at 8000 G, the supernatant is discarded and the precipitate is re-dispersed in a desired solvent to obtain a dispersion of 1.23 g of silver platelets.

Example 19

Two solutions are prepared:
Solution A:
12 g of the copolymer prepared according to Example 2 from WO2004/045755 (40% w/w dispersion in water) and 1.0 g of MPEG-5000-thiol are dissolved in 15 ml of de-ionized water and cooled to 0° C. Then, a solution of 3.4 g (20 mmol) of $AgNO_3$ in 22 ml of de-ionized water is added with stirring, and the resulting mixture is cooled to 0° C.
Solution B:
1.51 g (40 mmol) of $NaBH_4$ and 0.25 ml (ca. 1.98 mmol) of 7.9 M solution of dimethyl amine in water are dissolved in 49 ml of de-ionized water and cooled to 0° C.
Synthesis:
Solutions A and B are pumped with equal flow rates (30 ml/min) into a three-way connector (inner diameter of the inlets 1 mm). The resulting dispersion of spherical Ag particles is continuously drained from the third outlet (inner diameter 3 mm) of connector into a 1 l flask, pre-cooled to 0° C., containing 0.1 ml of TEGO Foamex 1488 defoamer and stirred for 10 min at this temperature. The mixture is then heated to 50° C. and treated with 25 ml of $H_2O_2$ (50% w/w solution in water) at a rate of 1.0 ml/min with vigorous stirring to obtain a dark-blue dispersion of silver platelets. The dispersion is centrifuged at 8000 G for 30 min, followed by decanting the supernatant and rinsing the precipitate with de-ionized water (2×40 mL). The precipitate is re-dispersed in 200 ml of 1,4-dioxan under ultra-sonication. The dispersion is centrifuged at 8000 G, the supernatant is discarded and the precipitate is re-dispersed in a desired solvent to obtain a dispersion of 2.08 g of silver platelets.

Example 20

Synthesis of a Suitable Dispersant (Compound of Formula (III))

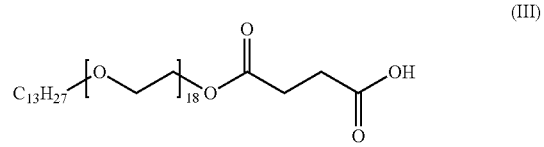

A mixture of 11.6 g (15 mmol) of O-(tridecyl)polyethylene glycol (Mn ca. 780) and 1.5 g (15 mmol) of succinic anhydride is stirred at 80° C. for 48 hours to obtain compound of formula (III) as a colorless viscous oil.

Example 21

4 g of EFKA 4580 are added to the dispersion obtained in Example 1, followed by 60 ml of diethyleneglycol dimethylether (diglyme). Water is removed by evaporation to obtain 28 g of a silver platelets dispersion in diglyme with a silver concentration of 7.7 mg/g.

Example 22

2 g of the dispersion obtained in Example 18 are mixed in 98 g of methylmethacrylate, 100 mg of azobisisobutyronitrile (0.1% w/w) are added, and the mixture is polymerized at 70° C. under continuous sonication to prevent particle agglomeration. A silver/polymethylmethacrylate composite material is obtained.

Example 23

10 g of polycarbonate (Makrolon®) are dissolved in 80 ml of boiling toluene. 2 g of the dispersion obtained in Example 18 are added, and the mixture is rapidly cooled to ambient temperature (20-25° C.). Toluene is removed by evaporation to obtain a silver/polycarbonate composite material.

Example 24

2 g of polyvinylbutyral (Mn 170000-250000) are dissolved in 16 g of ethanol, followed by addition of 2 g of the dispersion obtained in Example 18 to yield a viscous solution of a silver/polyvinylbutyral composite material.

The invention claimed is:
1. A method of manufacturing shaped transition metal particles, comprising:
 a) adding a reducing agent to an aqueous mixture comprising a transition metal salt and a polymeric dispersant to obtain a colloidal dispersion; and subsequently
 b) treating the colloidal dispersion with a peroxide to form particles in the form of nanoplatelets, wherein
the aqueous mixture comprises the transition metal salt in a concentration of higher than 2 mmol per liter,
the transition metal is selected from the group consisting of Cu, Ag, Au, Zn, Cd, Ti, Cr, Mn, Fe, Co, Ni, Ru, Rh, Pd, Os, Ir and Pt, and
wherein the method excludes a process including each of steps (a), (c) and (d), and one of steps (b1) and (b2):
  a) adding to an aqueous solution of the transition metal salt an acrylate or methacrylate monomer or oligomer, or a polyacrylate or polymethacrylate and a reducing agent to obtain a colloidal solution;
  b1) treating the colloidal solution with a peroxide; or
  b2) exposing the colloidal solution to UV- or visible light;
  c) adding a water soluble amine; and
  d) isolating nano-shaped transition metal particles or redispering nano shaped transition metal particles together with a dispersing agent in a liquid acrylate or methacrylate monomer.

2. The method of claim 1, wherein in step a) at least one additive selected from the group consisting of a thiol, a disulfide, a xanthate, a dithiocarbamate, an alcohol, an amine and a defoamer is present.

3. The method of claim 1, wherein the transition metal salt is a silver(I) salt.

4. The method of claim 1, wherein
the polymeric dispersant is a polymer comprising polar groups, and
the polymer is non-ionic or ionic.

5. The method of claim 1, wherein the polymeric dispersant is selected from the group consisting of:
a polyvinylalcohol, a polyvinylacetate, a polyvinylpropionate, a polyvinylpyrrolidone, a polyvinylpyrrolidine, a polyester, a polyethyleneimine, a polyvinylpyridine, a copolymer thereof and a blend thereof.

6. The method of claim 1, wherein the polymeric dispersant is present in the mixture of step a) in a concentration of 0.001 to 10% by weight, based on the total weight of the aqueous mixture.

7. The method of claim 1, wherein the reducing agent is selected from the group consisting of boranes and complexes thereof, metal boranates, hydrides, aluminates, aldehydes, carboxylic acids, hydrazines, hydrosulfites, stannanes, stannates, silanes, phosphines, phosphites and siloxanes.

8. The method of claim 1, wherein the method is carried out in the absence of a carboxylic acid-containing additive.

9. The method of claim 1, further comprising:
  c) replacing, at least partially, water with an organic medium.

10. The method of claim 9, wherein the organic medium comprises at least one selected from the group consisting of an organic solvent, a monomer, an oligomer, a polymer, and an emulsion.

11. The method of claim 1, wherein the shaped transition metal particles are in the form of nanoplatelets having a longest dimension of edge length of from 15 to 1000 nm and a thickness of 2 to 100 nm.

12. The method of claim 1, wherein the transition metal salt is selected from the group consisting of $AgNO_3$; $AgClO_4$; $Ag_2SO_4$; $AgCl$; $AgBr$; $AgI$; $AgOH$; $Ag_2O$; $AgBF_4$; $AgIO_3$; $AgPF_6$; $R^1CO_2Ag$, $R^1SO_3Ag$, wherein $R^1$ is unsubstituted or substituted $C_1$-$C_{18}$alkyl, unsubstituted or substituted $C_5$-$C_8$cycloalkyl, unsubstituted or substituted $C_7$-$C_{18}$aralkyl, unsubstituted or substituted $C_6$-$C_{18}$aryl or unsubstituted or substituted $C_2$-$C_{18}$heteroaryl; Ag salts of dicarboxylic, tricarboxylic, polycarboxylic acids, polysulfonic acids, P-containing acids; and mixtures thereof.

13. The method of claim 1, wherein the polymeric dispersant is at least one of a random copolymer, an AB-block copolymer and a comb-copolymer selected from the group consisting of a polyether, a polyurethane, a polyacrylate, a polyester, a polyamide, a polyalkylene glycol, a vinyl polymer, and an aromatic vinyl polymer.

14. The method of claim 1, wherein the polymeric dispersant is a partially neutralized polymeric dispersant, a quaternized polymeric dispersant, or a polymeric dispersant modified with at least one selected from the group consisting of a carboxylate group, a sulfonate group, a phosphonate group, a hydroxy group, an ether group, an ester group, and an amine group.

* * * * *